US012650945B2

(12) United States Patent
Vergis et al.

(10) Patent No.: US 12,650,945 B2
(45) Date of Patent: Jun. 9, 2026

(54) MEMORY MODULE ADAPTER CARD WITH MULTIPLEXER CIRCUITRY

(71) Applicant: Intel Corporation, Santa Clara, CA (US)

(72) Inventors: George Vergis, Portland, OR (US); Xiang Li, Portland, OR (US); Jun Liao, Portland, OR (US); Anthony M. Constantine, Portland, OR (US); Min Suet Lim, Gelugor (MY); Tongyan Zhai, Portland, OR (US); Konika Ganguly, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/874,117

(22) Filed: Jul. 26, 2022

(65) Prior Publication Data

US 2022/0358072 A1     Nov. 10, 2022

(51) Int. Cl.
*G06F 13/40*        (2006.01)
*G06F 12/06*        (2006.01)

(52) U.S. Cl.
CPC ...... *G06F 13/4068* (2013.01); *G06F 12/0646* (2013.01); *G06F 2213/40* (2013.01)

(58) Field of Classification Search
CPC ............. G06F 13/4068; G06F 12/0646; G06F 2213/40
USPC ........................................................ 710/301
See application file for complete search history.

(56) References Cited

U.S. PATENT DOCUMENTS

| | | | |
|---|---|---|---|
| 4,738,625 A | 4/1988 | Burton et al. | |
| 4,838,798 A | 6/1989 | Evans et al. | |
| 6,115,278 A * | 9/2000 | Deneroff ................... | G11C 5/04 |
| | | | 361/728 |
| 6,168,442 B1 | 1/2001 | Naoi | |
| 7,711,887 B1 * | 5/2010 | Warnes ................ | G06F 13/1694 |
| | | | 710/310 |
| 8,089,774 B2 | 1/2012 | Choi et al. | |
| 8,886,892 B2 * | 11/2014 | Thayer .................... | G11C 5/066 |
| | | | 711/E12.001 |
| 9,105,321 B1 | 8/2015 | Kim | |
| 10,467,160 B2 * | 11/2019 | Li ........................... | G11C 5/063 |
| 11,074,952 B1 * | 7/2021 | Schnell ................. | G11C 5/066 |
| 11,301,403 B2 * | 4/2022 | Ross .................... | G06F 13/1694 |
| 11,762,582 B2 * | 9/2023 | Ross ........................ | G11C 5/04 |
| | | | 711/154 |
| 2003/0161125 A1 * | 8/2003 | Dobler .................... | G06F 1/184 |
| | | | 361/784 |

(Continued)

FOREIGN PATENT DOCUMENTS

JP          2006041381 A      2/2006

OTHER PUBLICATIONS

Extended European Search Report for Patent Application No. 23172249.7, Completed on Nov. 23, 2023, 9 pages.

(Continued)

*Primary Examiner* — Christopher B Shin
(74) *Attorney, Agent, or Firm* — Compass IP Law PC

(57)          ABSTRACT
A memory module adapter card can adapt multiple compression-attached memory modules (CAMMs) to a dual inline memory module (DIMM) connector. Multiplexer circuitry on the adapter card enables multiplexing data amongst the memory modules attached to the adapter card during a same burst access sequence.

14 Claims, 15 Drawing Sheets

(56) References Cited

U.S. PATENT DOCUMENTS

| | | | | |
|---|---|---|---|---|
| 2005/0174825 | A1* | 8/2005 | Ware | G06F 13/1684 |
| | | | | 365/52 |
| 2008/0094808 | A1* | 4/2008 | Kanapathippillai | |
| | | | | H05K 1/0286 |
| | | | | 361/737 |
| 2008/0140900 | A1* | 6/2008 | Mysliwitz | G11C 5/04 |
| | | | | 710/301 |
| 2011/0302366 | A1* | 12/2011 | Peterson | G06F 12/0623 |
| | | | | 711/E12.001 |
| 2013/0039016 | A1* | 2/2013 | Wu | G06F 1/185 |
| | | | | 361/729 |
| 2015/0062797 | A1* | 3/2015 | Yin | G06F 1/185 |
| | | | | 361/679.32 |
| 2015/0255130 | A1* | 9/2015 | Lee | G06F 13/382 |
| | | | | 711/103 |
| 2015/0262633 | A1* | 9/2015 | Lee | G11C 5/04 |
| | | | | 710/308 |
| 2016/0026596 | A1* | 1/2016 | Klein | G06F 13/4068 |
| | | | | 710/313 |
| 2019/0042500 | A1* | 2/2019 | Agarwal | G06F 13/28 |
| 2019/0102331 | A1 | 4/2019 | Li et al. | |
| 2020/0201564 | A1* | 6/2020 | Walker | G06F 3/061 |
| 2021/0408724 | A1 | 12/2021 | Li et al. | |
| 2022/0368047 | A1 | 11/2022 | Vergis et al. | |

OTHER PUBLICATIONS

European Office Action, (EP Exam Report Article 94(3) EPC), for Patent Application No. 23172249.7, Mailed Feb. 24, 2025, 9 pages.
Office Action for U.S. Appl. No. 17/874,111, Mailed Jan. 12, 2026, 8 pages.

* cited by examiner

PCB 102

SOC 104

108

106

100

MEMORY MODULE ADAPTER CARD WITH MULTIPLEXER CIRCUITRY

FIELD

Descriptions are generally related to computer memory systems, and more particular descriptions are related to a memory module adapter card or printed circuit board to adapt compression-attached memory modules to a dual inline memory module connector.

BACKGROUND

The performance of computing systems is highly dependent on the performance of their system memory. Computing systems, such as desktop and server computing systems, typically include a motherboard with memory module connectors in which memory modules can be installed to increase system memory capacity. For example, vertical memory module connectors are widely used in server and desktop systems for memory capacity and bandwidth scaling.

FIG. 1 illustrates a side view of a computing system 100 with vertical memory module connectors 106. The computing system 100 includes a printed circuit board (PCB) (e.g., a mother board) onto which a system on a chip (SOC) 104 has been mounted or installed. The PCB 102 includes four memory module connectors 106. Conventionally, one vertical connector 106 can host only one memory module 108. Each of the memory module connectors 106 includes a slot or socket into which a memory module 108 can be inserted or seated. The connectors 106 are vertical in in the sense that the memory modules 108 are installed vertically or perpendicularly relative to the PCB 102.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a memory module adapter card with multiplexer circuitry can adapt compression-mounted memory modules to standard memory module connectors, such as DIMM connectors on client or server computing system motherboards. The multiplexer circuitry on the adapter card can multiplex between the attached memory modules to increase speed as well as memory capacity.

Conventional vertical memory modules have some limitations in terms of use in certain form factors as well as frequency scaling. Typically, a single vertical connector receives a single memory module, such as a dual inline memory module (DIMM). Therefore, increasing possible memory capacity in a conventional system involves increasing the number of vertical memory modules connectors. Increasing the number of vertical memory module connectors increases the PCB area used for memory.

In addition to the large PCB area consumed by vertical connectors, frequency scaling is also limited with conventional vertical memory module connectors. When using two DIMMs per channel (2DPC), two vertical connectors are used per channel, which limits frequency scaling for the memory bus. Thus, memory capacity and frequency scaling are limited with conventional vertical memory module connectors.

Compression attached memory modules (CAMMs) have emerged as a memory technology for small form factor computing systems. Unlike DIMMs that include pins at an edge of the module, CAMMs typically include a series of contact pads on a face of the module. The CAMM is attached horizontally to the motherboard (e.g., parallel to the motherboard) by compressing the module onto a connector on the motherboard and securing the module with screws.

The contact pads on the face of the CAMM allow for increased contact density relative to conventional DIMMs. Due to the fine contact pitch of CAMMs, CAMMs cannot be installed directly on conventional desktop or server motherboards. A typical desktop or server motherboard typically has four PCB layers, which is insufficient for wire routing for the high density CAMM contacts. Thus, conventional desktop and server systems are not compatible with CAMMs.

In contrast, an adapter card with compression-attached memory modules that can be inserted into a conventional vertical connector enables use of CAMMs in systems with vertical memory module connectors.

Figure 1:
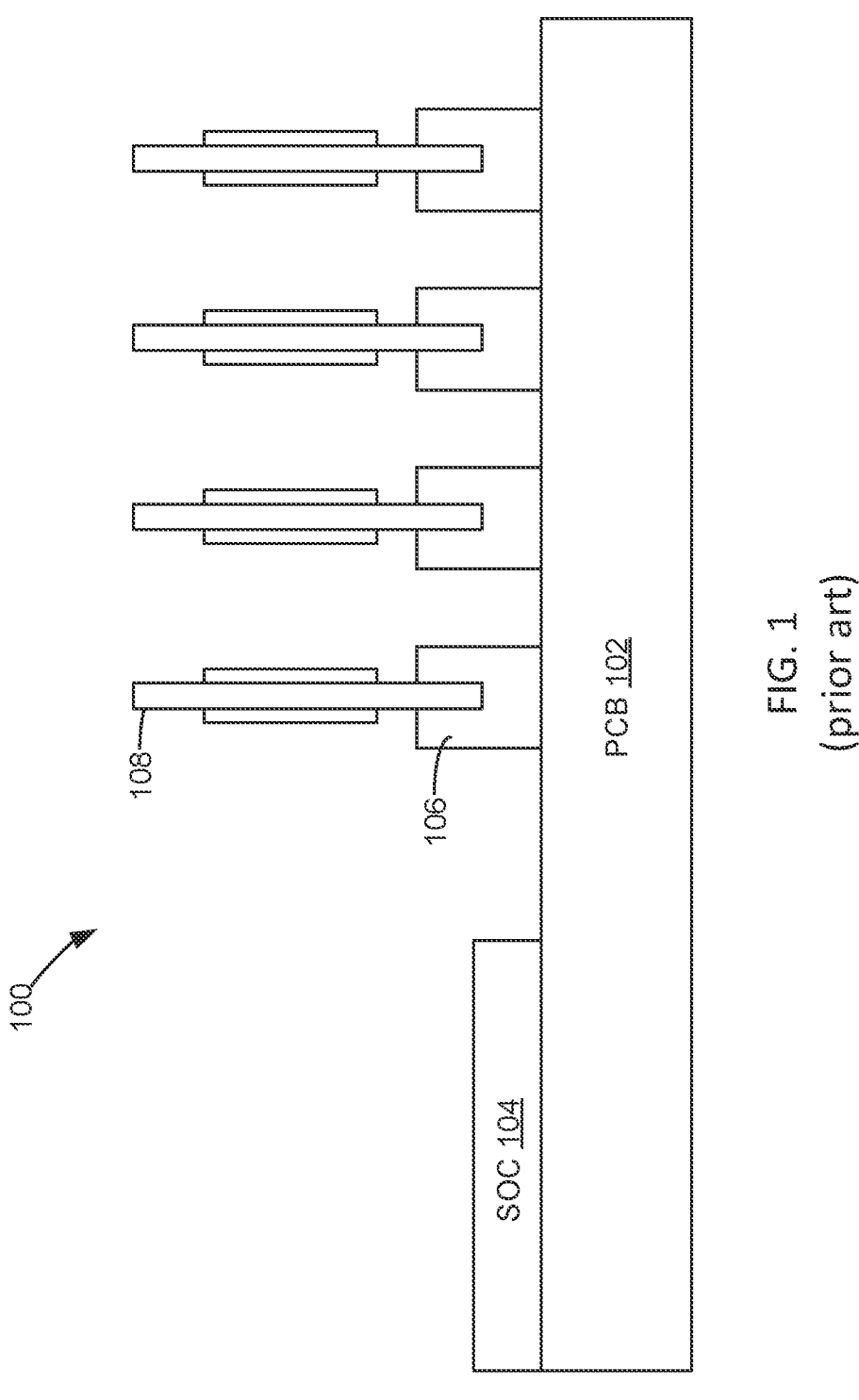
FIG. 1 illustrates a side view of a computing system with vertical memory module connectors.
Figure 2A:
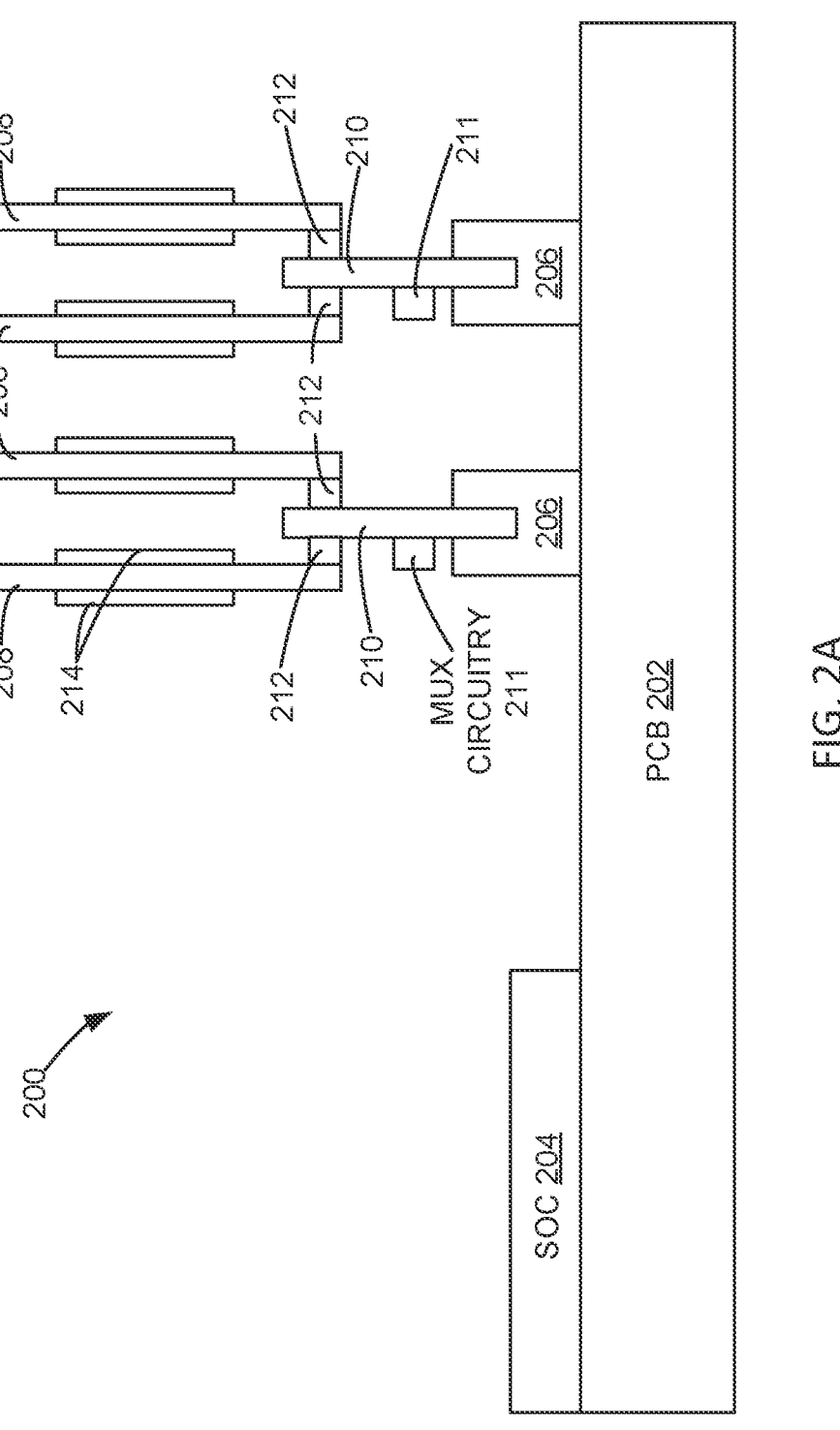
FIGS. 2A and 2B illustrate side views of an example of a system including adapter cards with compression-attached memory modules.
Figure 2B:
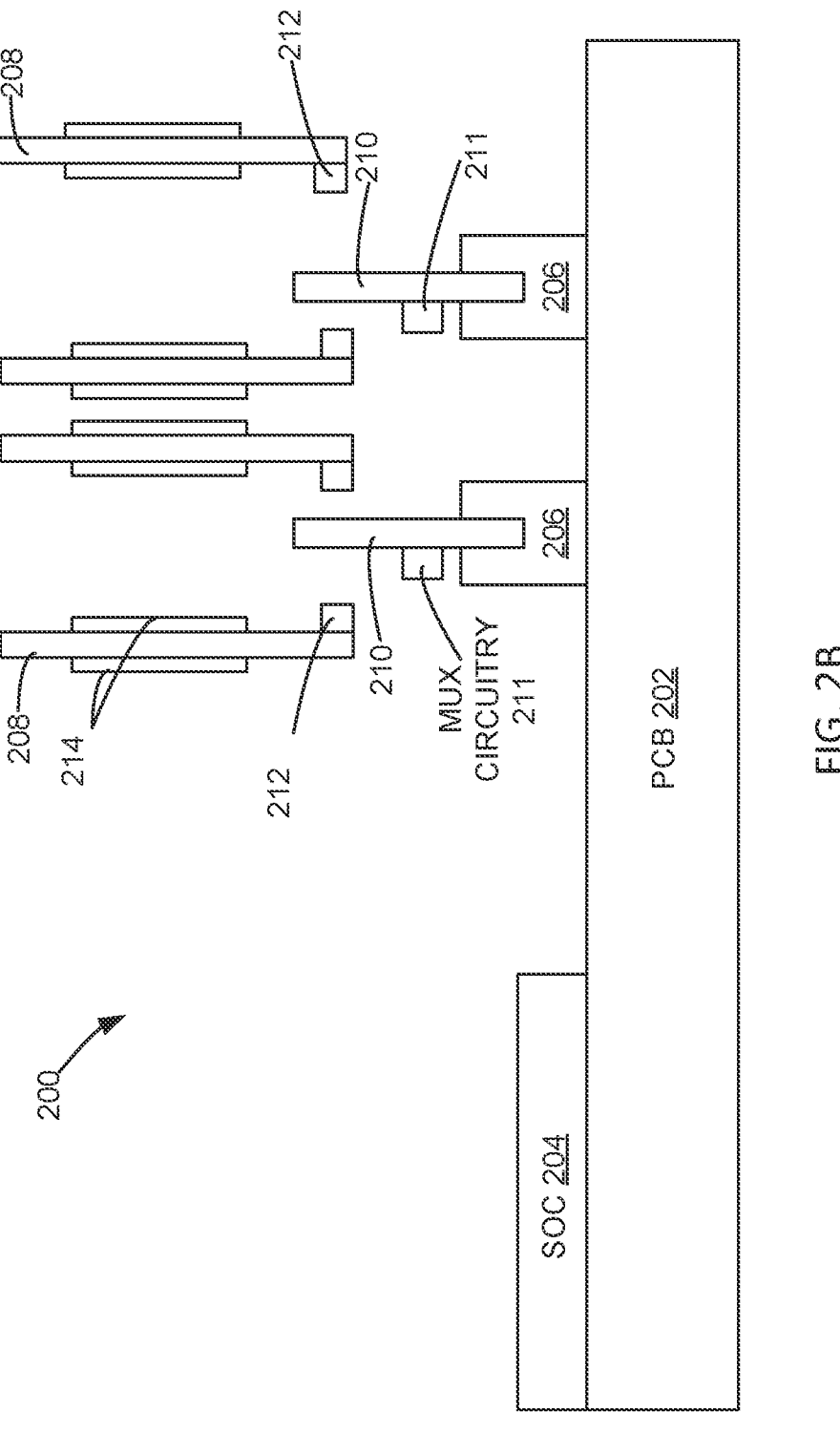

FIGS. 2A and 2B illustrate side views of an example of a system 200 including adapter cards 210 with compression-attached memory modules 208 and multiplexer circuitry. FIG. 2A illustrates the system 200 with the memory modules 208 attached to the adapter card 210, and FIG. 2B illustrates the system 200 before assembly or attachment of the compression-attached memory modules to the adapter card 210.

The system 200 includes an SOC 204 on a PCB 202. In one example, the SOC 204 includes a processor (e.g., a central processing unit (CPU)) and one or more other components such as a graphics processing unit (GPU), accelerator, storage, memory, input/output circuitry, peripheral interface circuitry, and/or other components. In one example, the PCB is a multi-layer PCB. The PCB may be a motherboard, a main board, a system board, a logic board, or any other printed circuit board onto which components can be attached, mounted, connected, or otherwise coupled. In the example of FIG. 2A, the PCB 202 includes two memory module connectors 206. The memory module connectors 206 may be referred to as vertical connectors. In one example, each of the memory module connectors 206 includes a slot or socket that can receive a memory module, such as a DIMM.

In one example, the memory module connectors 206 are DIMM connectors, such as standard DIMM connectors, MicroDIMM connectors, small outline DIMM (SO-DIMM) connectors, or other DIMM connectors. In one example, the DIMM connectors 106 are compatible with a memory standard such as a double data rate synchronous dynamic random-access memory (DDR) standard, such as DDR3 (Double Data Rate version 3, original release by JEDEC (Joint Electronic Device Engineering Council) on Jun. 27, 2007), DDR4 (DDR version 4, originally published in September 2012 by JEDEC), DDR5 (DDR version 5, originally published in July 2020), LPDDR3 (Low Power DDR version 3, JESD209-3B, August 2013 by JEDEC), LPDDR4 (LPDDR version 4, JESD209-4, originally published by JEDEC in August 2014), LPDDR5 (LPDDR version 5, JESD209-5A, originally published by JEDEC in January 2020), or others or combinations of memory technologies, and technologies based on derivatives or extensions of such specifications.

However, as shown in FIG. 2A, instead of a DIMM, the system 200 includes adapter cards 210 inserted into the memory module connectors 206. In one example, an adapter card 210 includes a PCB onto which one or more memory modules can be compressibly attached. For ease of reference and consistency, the following description refers to the apparatus 210 as an adapter card; however, the apparatus 210 may be referred to as a card, an adapter, a compression-attached memory module (CAMM) adapter, a riser card, an interposer, a compression mount technology (CMT) interposer, a module, etc.

Referring to FIG. 2A, the system 200 includes two memory modules 208 compressibly attached to each of the adapter cards 210. For consistency and ease of understanding, the following description generally refers to the memory modules 208 as compression-attached memory modules (CAMMs); however, any memory module that can be attached or coupled with the adapter card 210 may be used. Other terms for the memory modules 208 may be used, such as compression mount technology (CMT) modules, CMT memory modules, memory modules, etc. Note that although the system 200 of FIG. 2A illustrates two memory module connectors, other systems may include one memory module connector or more than two memory module connectors (e.g., 3, 4, or more than 4 memory module connectors). Similarly, although FIG. 2A shows two memory modules coupled with each adapter card, a single memory module or more than two memory modules may be coupled with an adapter card. Also note that the elements of FIG. 2A and the following figures are not necessarily drawn to scale.

In one example, there are compressible conductive contacts between a memory module 208 and the adapter card 210. In one example, the compressible conductive contacts may be included in, or a part of, a compression mount technology (CMT) connector 212 between the memory module 208 and the adapter card 210.

Each of the memory modules includes memory chips or dies 214 that provide memory to the system 200. Thus, the adapter card includes conductive traces to connect the memory modules 208 to the memory module connectors 206. In one example, the adapter card 210 includes conductive traces between contacts at the memory module side of the card and the multiplexer circuitry 211, and between the multiplexer circuitry 211 and the contacts at the DIMM connector side of the card.

Thus, in one example, a memory module can be attached on one or both sides of the adapter card 210, which can be inserted into a DIMM connector 206, which enables fewer vertical connectors on the PCB 202. In the case of multiple memory modules per channel (e.g., two DIMMs per channel (2DPC), voltage and timing margins can be significantly improved by coupling two modules 208 with one DIMM connector 206 via the adapter card 210. This configuration by itself, however, does not increase the double data rate (DDR) capable of being supported. One option for increasing speed of memory access is through package or PCB routing optimizations. However, optimization through package or PCB routing is typically constrained by the system form factor, the PCB stack-up or technology, or the PCB cost.

In contrast, an adapter card 210 with multiplexer circuitry 211 can increase (e.g., double) the DDR speed rate along with the increased memory capacity provided by the adapter card 210 and compression-attached memory modules 208. In one example the circuitry 211 takes data either going to or from two memory modules 208 attached to the adapter card 210 and time multiplexes between the two memory modules 208. Time multiplexing between the two modules 208 enables accessing the two modules in parallel and interleaving between the two. The cycle time can effectively be hidden because while one memory module is being made ready for access, the other memory module is providing or receiving data. Thus, the output of the multiplexer circuit 211 of the adapter card 210 can be twice as much as the output of a memory module 208, to enable doubling the effective throughput or bandwidth.

Figure 3:
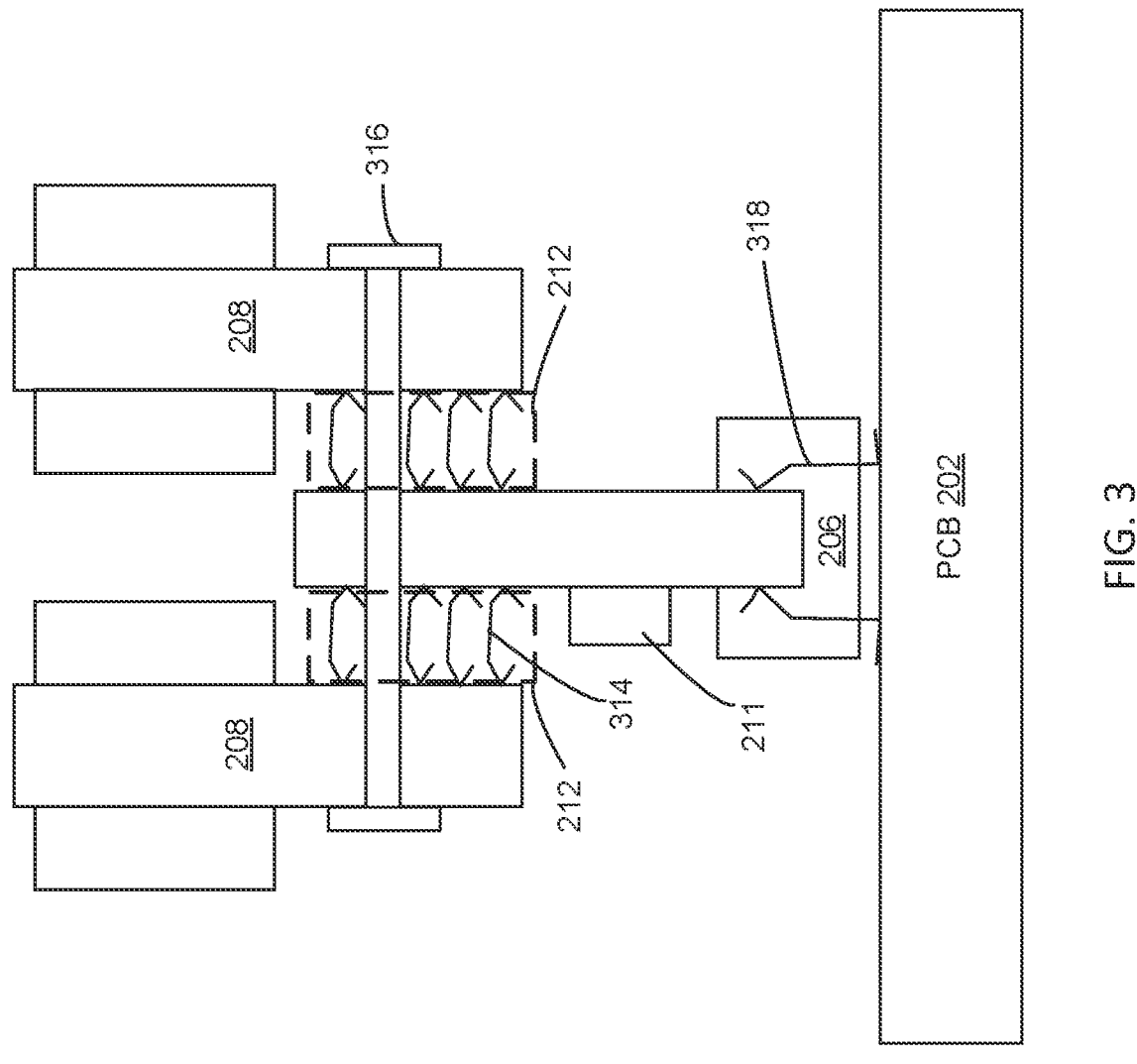
FIG. 3 illustrates a side view of an example of an adapter card with compression-attached memory modules and multiplexer circuitry.

FIG. 3 illustrates a side view of an example of an adapter card 210 with compression-attached memory modules 208 and multiplexer circuitry 211. As illustrated in the example of FIG. 3, the adapter card 210 is inserted into or seated in the memory module connector 206 on the PCB 202. The adapter card 210 includes first conductive contacts to couple with contacts 318 of the memory module connector 206. In one example, the adapter card 210 includes additional conductive contacts on the faces of the adapter card 210 to couple with the conductive contacts 314 between the adapter card 210 and the memory modules 208.

In one example, the conductive contacts 314 are compressible (e.g., compressible pins) that can be compressed on one or both ends. In one example, the compressible conductive contacts are included in or housed in a connector 212 (e.g., a CMT connector) or other support structure to support and maintain alignment of the compressible conductive contacts 314. In the example illustrated in FIG. 3, the compressible conductive contacts are shown as C-shaped contacts, however, contacts having any shape can be used.

The memory modules 208 are compressibly attached to the adapter card 210 with a fastener 316. In one example, the fastener 316 includes one or more screws that pass through holes in the memory modules 208 and the adapter card 210 to apply pressure to the assembly. In one example, the pressure applied by the fastener 316 compresses the conductive contacts 314 to maintain mechanical stability and electrical connections between the compressible conductive contacts 314 and the contacts on the memory modules 208 and the adapter card 210. According to one example, the adapter card 210 includes traces between the compressible contacts 314 and the multiplexer circuitry 211, and between the multiplexer circuitry and the DIMM contacts 318.

Figure 4:
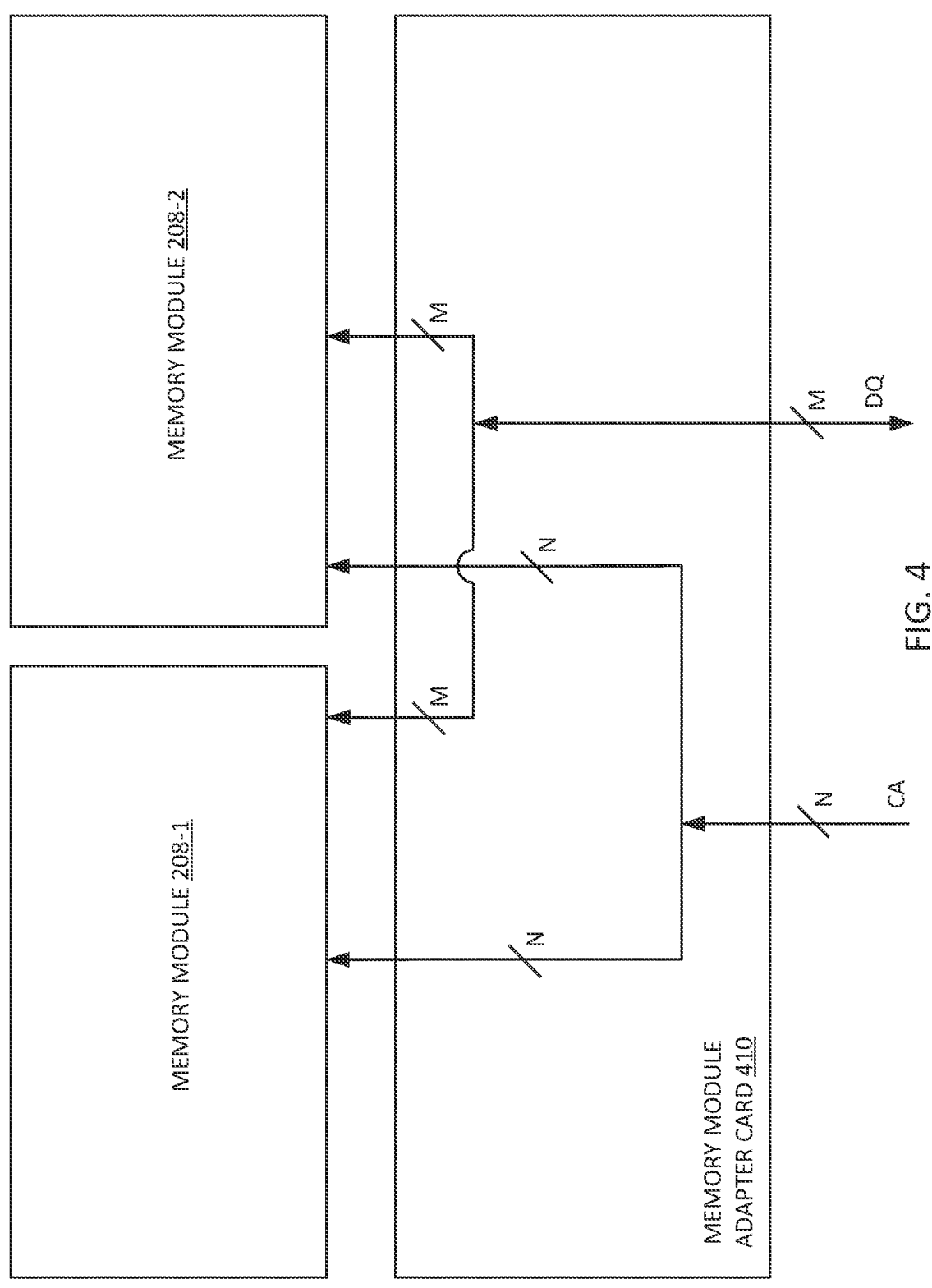
FIG. 4 illustrates a block diagram of an example of an adapter card with compression-attached memory modules without multiplexer circuitry.
Figure 5A:
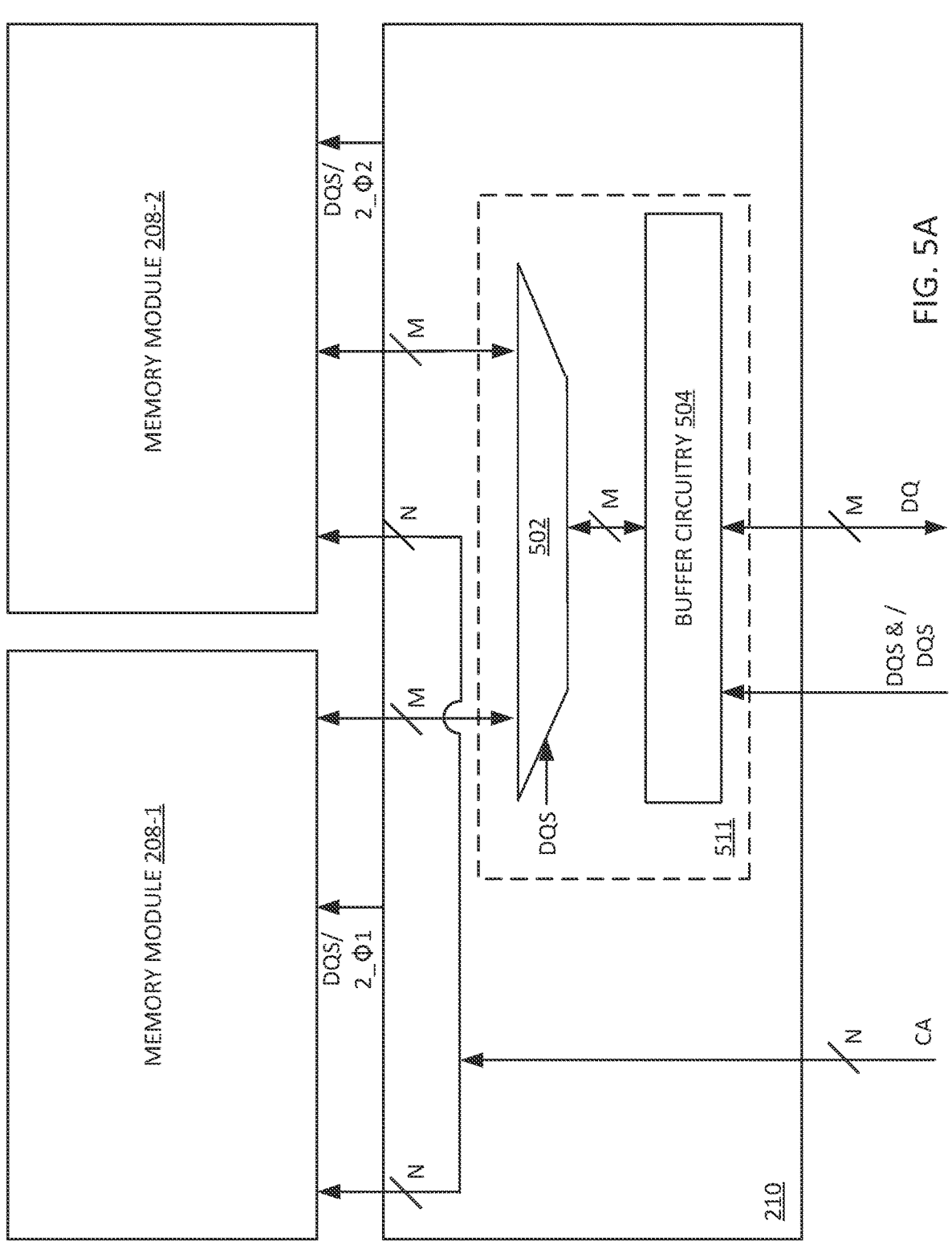
FIGS. 5A and 5B illustrate block diagrams of examples of adapter cards with multiplexer circuitry.
Figure 5B:
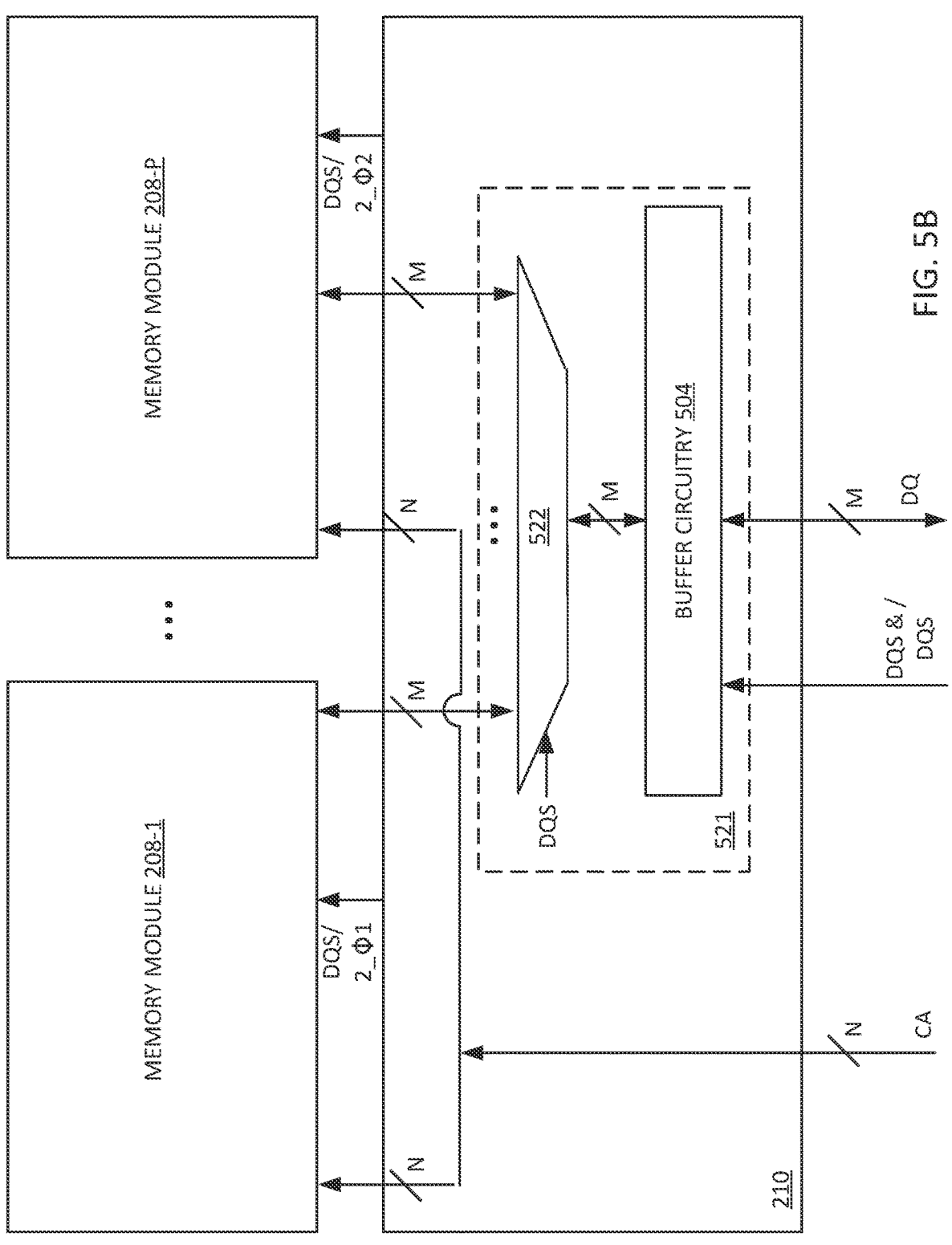

FIGS. 4, 5A, and 5B illustrate block diagrams of examples of adapter cards with compression-attached memory modules. FIG. 4 illustrates an example of an adapter card 410 without multiplexer circuitry on the adapter card, and FIGS. 5A and 5B illustrate examples of adapter cards with multiplexer circuitry. Referring first to FIG. 4, in the illustrated example, the adapter card 410 couples the data bus (DQ) and the command/address bus (CA) with both memory modules 208-1 and 208-2 in a multi-drop form. Thus, the DQ and CA signals from the host memory controller (e.g., via a vertical DIMM connector) are passed to both memory modules 208-1 and 208-2 via the adapter card 410. In the illustrated example, the CA bus is N bits wide and the DQ bus is M bits wide.

For each memory access (e.g., a read or write access with a corresponding address) that is issued on the memory channel, the corresponding set of CA signals includes chip select signals (CS) and/or other signals that specifically identify a particular memory module (e.g., one of CAMMs 208-1 and 208-2) on the channel and also a particular rank on the identified memory module that is targeted by the access. Circuitry (e.g., register and redrive circuitry) on each memory module monitors the chip select signals and recognizes when its corresponding memory module is being accessed. When the circuitry recognizes that its memory module is being targeted, the logic can then further determine a particular rank of memory chips on the memory module that is being targeted by the memory access. The register and redrive circuitry can then route the CA signals that are on the memory channel to the memory chips of the specific targeted rank of memory chips on the memory module.

Due to the loading resulting from the multi-drop configuration, there are limitations on the data bus frequency that can be achieved with an adapter card without multiplexer circuitry, such as the example in FIG. 4.

FIG. 5A illustrates a block diagram of an example of an adapter card 210 with two compression-attached memory modules 208-1 and 208-2 and multiplexer circuitry 511. In FIG. 5A, a 2:1 multiplexer (mux) 502 with the DQ strobe (DQS) as the select input is included on the adapter card 210. Note that multiplexing circuitry 511 may include actual multiplexing circuitry (such as multiplexer 502) but also circuitry designed to eliminate phase differences in data through store-and-forwarding (which may be performed by buffer circuitry, such as the buffer 504). Other embodiments may include both actual multiplexing circuitry and store-and-forwarding circuitry. In embodiments that do use actual multiplexing circuitry, such actual multiplexing circuitry may be physically integrated into the buffer semiconductor chips used to implement buffer circuitry 504. Thus, although the multiplexer 502 and buffer 504 are shown separately in FIG. 5A, the multiplexer 502 and buffer 504 may be implemented in the same circuitry. Also note that although a single multiplexer 502 and a single buffer 504 are shown, the adapter card 210 may include more than one multiplexer and buffer. For example, each byte (or other granularity) of the DQ bus may be associated with its own multiplexer and buffer on the adapter card 210.

Regardless of the exact implementation of the multiplexing circuitry, the adapter card 210 includes circuitry to multiplex data from the memory modules 208-1 and 208-2 and demultiplex data to the memory modules 208-1 and 208-2. Note that for ease of reference, the term "multiplexer" and "multiplexing" will be used in this application to refer to both multiplexing (e.g., read data from the memory modules to the host) and demultiplexing (e.g., write data from the host to the memory modules). Referring to an example of a write operation, data from the host (e.g., a host memory controller) for a write burst sequence is received by the adapter card 210 and multiplexed between the memory modules 208-1 and 208-2. For a read operation, data from the memory modules 208-1 and 208-2 is received and interleaved by the multiplexer 502 and sent to the host.

FIG. 5B is similar to FIG. 5A, except that there are more than two compression-attached memory modules attached to the adapter card 210. In an example with more than two compression-attached memory modules, the multiplexer circuitry multiplexes the data to and from the multiple memory modules. For example, an adapter card with three compression-attached memory modules attached to the adapter card may include 3:1 multiplexer circuitry. Similarly, an adapter card with four compression-attached memory modules may include 4:1 multiplexer circuitry. Generally, in one example, the adapter card 210 includes P:1 multiplexer circuitry 521 (e.g., a P:1 mux 522) for multiplexing amongst P memory modules 208-1-208-P, where P is a positive integer greater than 1.

Figure 6:
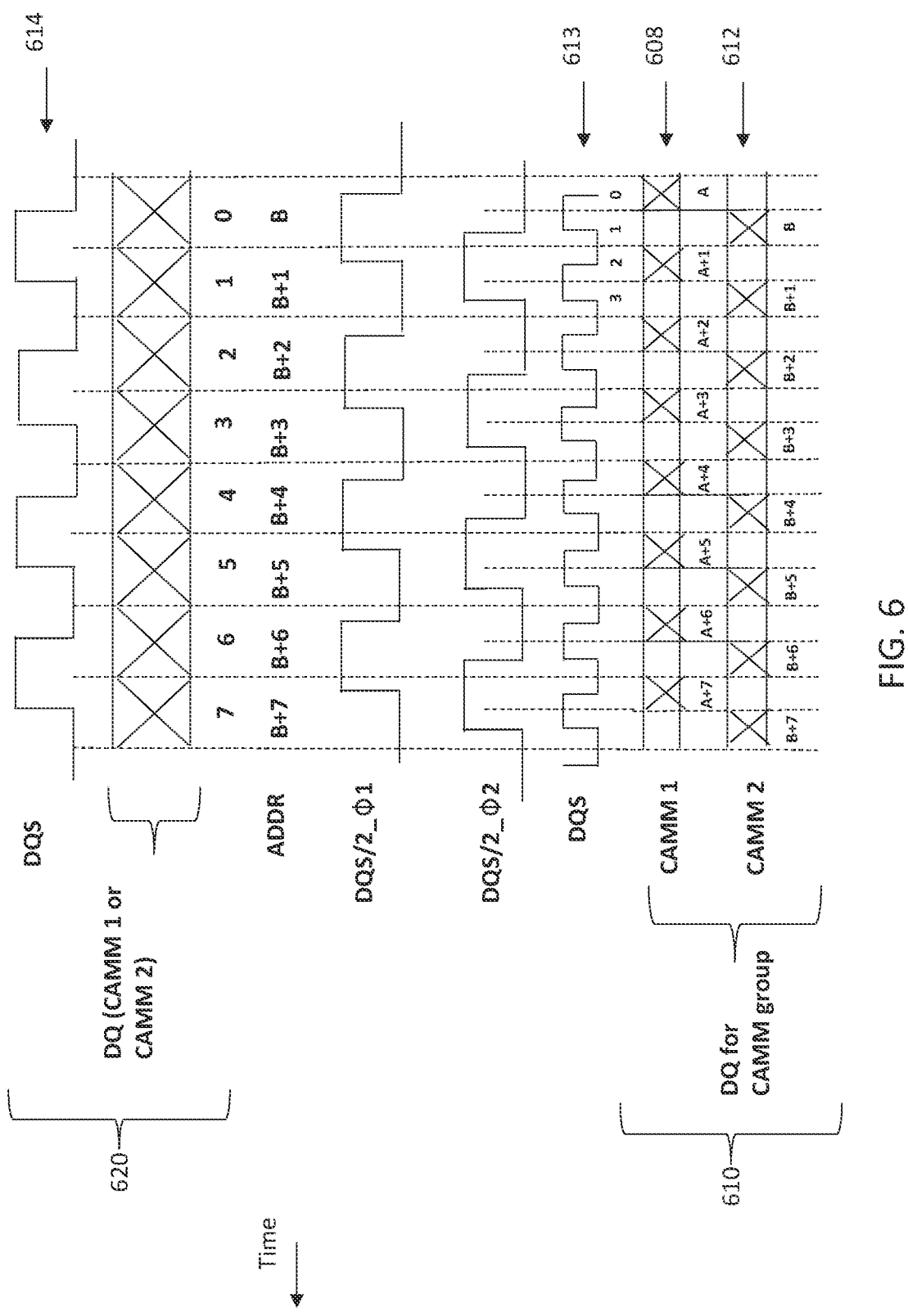
FIG. 6 is a high-level timing diagram of an example of a write operation for an adapter card with two compression-attached memory modules.

FIG. 6 is a high-level timing diagram for a write operation for compression-attached memory modules on an adapter card. Timing diagram 620 shows a write transfer performed by an apparatus including an adapter card with two compression-attached memory modules without multiplexer circuitry on the adapter card, such as the apparatus of FIG. 4. Timing diagram 610 shows a write transfer performed by an apparatus including an adapter card with two compression-attached memory modules with multiplexer circuitry on the adapter card, such as the apparatus of FIG. 5A.

Referring first to the timing diagram 620 for a compression-attached memory module on an adapter card without multiplexer circuitry, the targeted memory module (e.g., CAMM 1 208-1 or CAMM 2 208-2) receives eight transfers over eight cycles 0 through 7. In one example, each transfer is 64 bits, resulting in a total burst transfer of 512 bits over the eight cycles.

In contrast, the timing diagram 610 shows a write transfer for two compression attached memory modules (e.g., CAMM 1 208-1 and CAMM 2 208-2) on an adapter card with multiplexer circuitry. In the illustrated example, the write transfer for CAMM 1 and CAMM 2 includes two multiplexed data streams 608, 612 that target the different memory modules attached to the adapter card and coupled with the data bus DQ. For example, referring to FIG. 5A, data stream 608 targets the memory module 208-1, and data stream 612 targets the memory module 208-2. In one example, a multiplexer 502 on the adapter card provides the multiplexing between the data transfers on the DQ bus for the two targeted memory modules.

Referring again to FIG. 6, during a first cycle (0) of the data strobe (DQS) signal 613, a first transfer on the DQ bus targets a first rank of memory chips of the first memory module 208-1 at base address A. During a second immediately following DQS cycle (1), a second transfer on the DQ bus targets a second rank of memory chips on memory module 208-2 at base address B. During a third immediately following DQS cycle (3), a third transfer on the DQ bus targets the first rank of memory chips of the first memory module 208-1 at incremented address A+1. During a fourth immediately following DQS cycle, a fourth transfer on the DQ bus targets a fourth rank of memory chips of the memory module 208-2 at incremented base address B+1.

Consider one such example where each transfer of the data streams 608 and 612 includes 64 bits. In one such example, the process continues until 512 bits have been transferred for both targeted memory modules, which corresponds to 8 cycles for each of the targeted memory modules (64 bits per transfer×8 transfers=512 bits) which, in turn, corresponds to 16 total cycles of the DQS signal 613 because of the multiplexing activity.

Note that the DQS signal 613 for the multiplexed compression-attached modules has a higher frequency than the DQS 614 for compression attached memory modules on an adapter card without multiplexer circuitry. As mentioned above, because a multi-drop bus approach is not used for the DQ bus in the multiplexer approach, the frontside DQ bus (e.g., the DQ bus between the adapter card and the CPU) can support a higher (e.g., double for two CAMMs) the frequency. However, the speed/frequency of the backside DQ bus (e.g., the DQ bus between the multiplexer circuitry of the adapter card and the CAMM) does need not double. For example, the multiplexing activity results in a transfer to each of the targeted CAMMs once per cycle of DQS 614. As such, with only one transfer per DQS cycle, both the CAMMs operate at approximately the same frequency/speed as the CAMMs on an adapter card without multiplexing circuitry. Thus, for a write operation, the multiplexer circuitry is to receive write data from a host at a first frequency and send demultiplexed write data to CAMMs at a second frequency that is slower than the first frequency. For a read operation, the multiplexer circuitry is to receive the read data from the host at the second slower frequency and send the read data to the host at the higher frequency. In one example in which two compression-attached modules are attached to the adapter card with multiplexer circuitry, the frontside DQ bus can operate at twice the frequency of the backside DQ bus.

Note that multiplexed approach of timing diagram 610 also transfers the combined data targeted for both memory modules according to a double data rate technique (e.g., both rising and falling edges of the DQS signal 613 correspond to DQS cycles). However, according to one example, the multiplexing activity on the adapter card causes the memory chips themselves to be accessed according to a double data rate technique with a clock having a frequency that is one half the frequency of the DQS signal 613 (e.g., each memory chip on the CAMMs experiences a data transfer on the rising and falling edge of a clock resembling the slower clock 614). These clocks are represented by the DQS/2_Φ1 and DQS/2_Φ2 signals in FIG. 6.

The DQS/2_Φ1 and DQS/2_Φ2 signals indicate that the different targeted CAMMs that are multiplexed over a same burst window can be accessed at different times with respect to one another. For example, the rank of memory chips on the first CAMM 208-1 is accessed at a first clock phase and the rank of memory chips on the second CAMM 208-2 is accessed at a second (e.g., lagging or delayed) clock phase. In one example, for a write operation, the multiplexer circuitry sends the demultiplexed write data to the first CAMM 208-1 with a phase shift relative to the demultiplexed write data sent to the second CAMM 208-2. For a read operation, the multiplexer circuitry sends the multiplexed read data from the first CAMM 208-1 to the host with a phase shift relative to the multiplexed read data from the second CAMM 208-2. In one such example, data emerges from the buffering logic circuitry (e.g., the buffer 504 of FIG. 5A) in the sequence order in which they are received from the front-side DQ bus (in the case of a write). The multiplexer (e.g., mux 502 of FIG. 5A) then sends the data to the targeted compression attached memory module (e.g., CAMM 208-1 or CAMM 208-2 of FIG. 5A). In the example illustrated in FIGS. 5A and 6, the multiplexer 502 receives the DQS signal 613 as a select input to select the correct compression-attached module to send the data to.

Other approaches may access the different targeted memory modules that are multiplexed over a same burst window in phase with one another (e.g., at the same time). For example, according to approach, the buffering logic circuitry (e.g., the buffer 504) may implement a store-and-forward approach to one of the targeted memory module's data streams to eliminate the phase difference that exists between the respective data streams of the memory modules on the data bus. For example, referring to FIG. 6, the data targeted to the first CAMM 208-1 (represented by stream 608) may be delayed by the buffer circuitry 504 for one cycle of the DQS signal 613 which, temporarily aligns the data with the data that is targeting the CAMM 208-2 (represented by stream 612). Thus, buffer circuitry can be used to store-and-forward at least some of the data, enabling data from both streams to then be simultaneously written into (or read from) both compression-attached memory modules. In one example, for a write operation, the multiplexer circuitry sends the demultiplexed write data to the first CAMM 208-1 and the second CAMM 208-2 at the same time.

Note that this approach may obviate the existence of any actual multiplexing circuitry 502. That is, the multiplexing activity is logically (rather than actually) achieved with the store and forwarding performed by the buffer circuitry. Therefore, as mentioned above, multiplexing circuitry may include not only actual multiplexing circuitry (such as the multiplexer 502) but also circuitry designed to eliminate phase differences in data through store-and-forwarding (which may be performed by buffer circuitry 504). Other examples may include both actual multiplexing circuitry and store-and-forwarding circuitry. In examples that do use actual multiplexing circuitry, such actual multiplexing circuitry may be physically integrated into the buffer semiconductor chips used to implement buffer circuitry 504.

Although the above description has been directed to a write process, a read process can involve reading data from selected compression-attached memory modules consistent with the techniques described above. As with writes, the targeted memory modules may be accessed out-of-phase with one another (e.g., with actual multiplexing circuitry and no store-and-forwarding in the read direction in the buffer circuitry) or simultaneously with one another (e.g., with store-and-forwarding in the read direction in the buffer circuitry).

Figure 7:
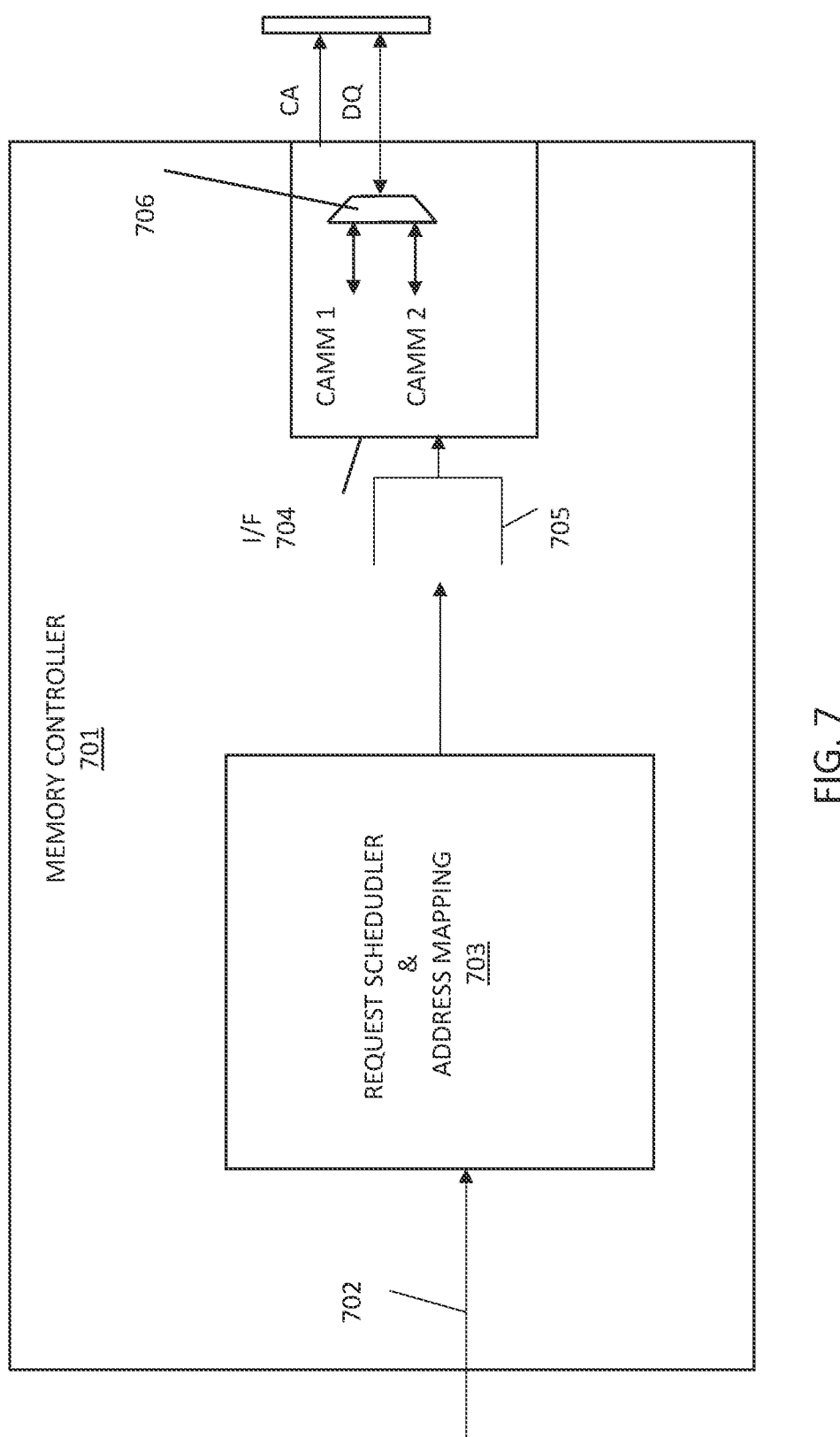
FIG. 7 is a block diagram of an example of a memory controller that is capable of driving a memory channel with two compression-attached memory modules on an adapter card with multiplexer circuitry.

FIG. 7 is a block diagram of an example of a memory controller 701 that is capable of driving a memory channel as described above with compression-attached memory modules attached to an adapter card with multiplexer circuitry (e.g., such as the adapter card 210 of FIG. 5A or 5B coupled with the data bus). In the illustrated example, the memory controller 701 includes a memory channel interface 704 that includes one or more DQ link interfaces. For example, the interface 704 may include a single or pair of DQ point-to-point link interfaces or multi-drop interfaces to memory module connectors, such as the DIMM connectors 206 of FIG. 2A. In one such example, the interface 704 includes input/outputs (I/Os) to couple with DQ point-to-point or multi-drop links. Although only a single memory channel interface 704 is illustrated in FIG. 7, the memory controller 701 may include multiple memory interfaces.

The memory controller 701 receives memory read and memory write requests at input node 702. Scheduler and address mapping circuitry 703 orders and directs the requests to the appropriate memory channel interface (e.g., interface 704). In one example, each memory channel interface includes its own address mapping logic circuitry to map each request to its correct DIMM slot.

The memory controller 701 includes an inbound queue 705 before the interface 704, and the address mapping circuitry of the interface 704 may pull requests out-of-order from the queue 705 to keep the compression-attached memory modules that are coupled to the interface busy (e.g., if the front of the queue contains requests that map to only one of the compression-attached memory modules, the address mapping logic may pull a request from further back in the queue 705 that maps to another compression-attached memory module. Thus, in order to keep the DQ bus at maximum capacity when possible, the interface's address mapping logic circuitry may service requests out-of-order from the interface's queue 705 so that requests whose addresses map to different compression-attached memory modules attached to the same adapter card can be serviced concurrently and multiplexed on the DQ bus.

The memory interface circuitry 704 includes a multiplexer circuit 706 to multiplex data from or to multiple compression-attached memory modules on the same adapter card and coupled with the same DQ bus during a same burst transfer process as described above. As described above, both multiplexer 706 may operate to concurrently transfer the data of multiple compression-attached memory modules on an adapter card between the interface 704 and the DIMM slot connected with the adapter card during a same burst transfer sequence. Multiplexing may be done actually or logically (e.g., with multiplexers and/or store-and-forward circuitry).

The memory interface 704 also includes signal generation logic circuitry to generate the appropriate CA and DQ signals consistent with the teachings above. The memory controller 701 may include configuration register space whose corresponding information is used to configure each memory interface. In one example, the register space is used to store whether a single or multiple compression-attached memory modules are coupled with a DIMM slot, and/or whether or not data over the DQ bus is to be multiplexed between or amongst the compression-attached memory modules.

Figure 8:
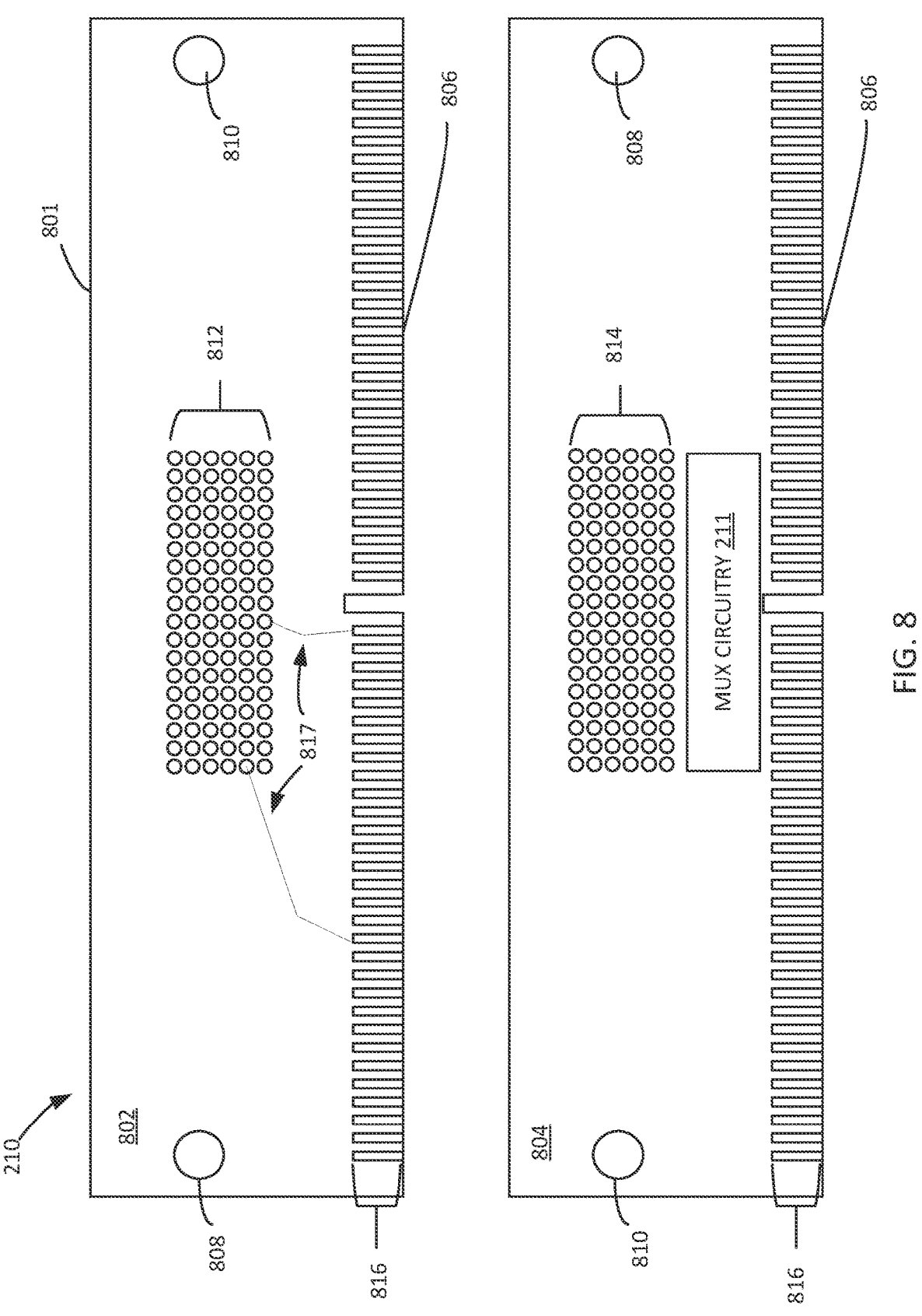
FIG. 8 illustrates front and back faces of an example of an adapter card.

FIG. 8 illustrates front and back faces of an example of an adapter card 210. The adapter card includes a PCB 801. The PCB has an edge 806 to be received by a memory module connector, such as a vertical DIMM connector. The PCB 801 includes conductive contacts 816 to couple with contacts of the DIMM connector (e.g., contacts 318 of FIG. 3). In one example, the first conductive contacts 816 are proximate to the edge 806 of the PCB 801 to be received by the DIMM connector. In one example, the conductive contacts 816 include conductive fingers (e.g., gold fingers) to connect to contacts in the slot of a DIMM connector.

The PCB also includes second conductive contacts 812 on a first face 802 of the PCB 801. In one example, second conductive contacts 812 on the first face of the PCB 801 are to couple with a CAMM via a CMT connector. In the example illustrated in FIG. 8, the PCB also includes third conductive contacts 814 on a second face 804 of the PCB 801. In one example, the third conductive contacts 814 are to couple with a second CAMM via a second CMT connector. In one example, the conductive contacts 812 and 814 are pads to couple with the contacts of a CMT connector.

The PCB includes conductive traces between the first conductive contacts 816 and the second conductive contacts 812, and between the first conductive contacts 816 and the third conductive contacts 814. The example in FIG. 8 illustrates only two conductive traces 817 in order to not obscure the clarity of the drawing, however, in one example, each of the contacts 816 is coupled with one of the contacts 812 and one of the contacts 814 via traces on the PCB 801. Note that the conductive contacts 816, 812, and 814 of FIG. 8 are not drawn to scale and not drawn to be in compliance with a particular standard. The number, size, pitch, and location of the contacts 816, 812, and 814 depend on the type of memory module connector to receive the adapter card 210 and the type of memory module to be attached to the adapter card 210.

In one example, the conductive traces of the adapter card adapt or translate the pinout differences between the compression-attached memory module and the DIMM connector. For example, the conductive traces couple the first conductive contacts 816 having a first pin-out with corresponding contacts of the second conductive contacts 812 having a second pin-out that is different than the first pin-out. In one example, the first conductive contacts include power, ground, and data contacts compatible with a first memory standard (such as a DDR standard) having the first pin-out; and the second conductive contacts include second power, ground, and data contacts compatible with a second memory standard (such as a CAMM standard) having the second pin-out. The conductive traces couple the power, ground, and data contacts of the first conductive contacts 816 with the corresponding power, ground, and data contacts of the second conductive contacts 812. In addition to different pin-outs, in one example, the first conductive contacts have a different pitch than the second conductive contacts 812. For example, the second conductive contacts 812 for coupling with the compression-attached memory module may have a smaller pitch than the conductive contacts 816 for coupling with the DIMM connector. Similarly, in one example, the third conductive contacts 814 has a pin-out and pitch that is different than the first conductive contacts 816.

The example of FIG. 8 also illustrates two holes 808, 810 for a fastener to pass through to attach one or more memory modules to the PCB 801. Although two holes are shown in FIG. 8, other examples may include more than two holes to receive more than two fasteners. The holes 808, 810 are shown as round, however, holes or openings having other shapes may also or alternatively be used to receive fasteners to attach memory modules to the PCB 801.

The adapter card 210 of FIG. 8 includes multiplexer circuitry 211 between the conductive contacts 816 and the conductive contacts 814. The multiplexer circuitry 211 of FIG. 8 may be in accordance with the multiplexer circuitry described above. In one example, the circuitry 211 multiplexes data between a first memory module and a second memory module during a same burst access sequence.

Figure 9:
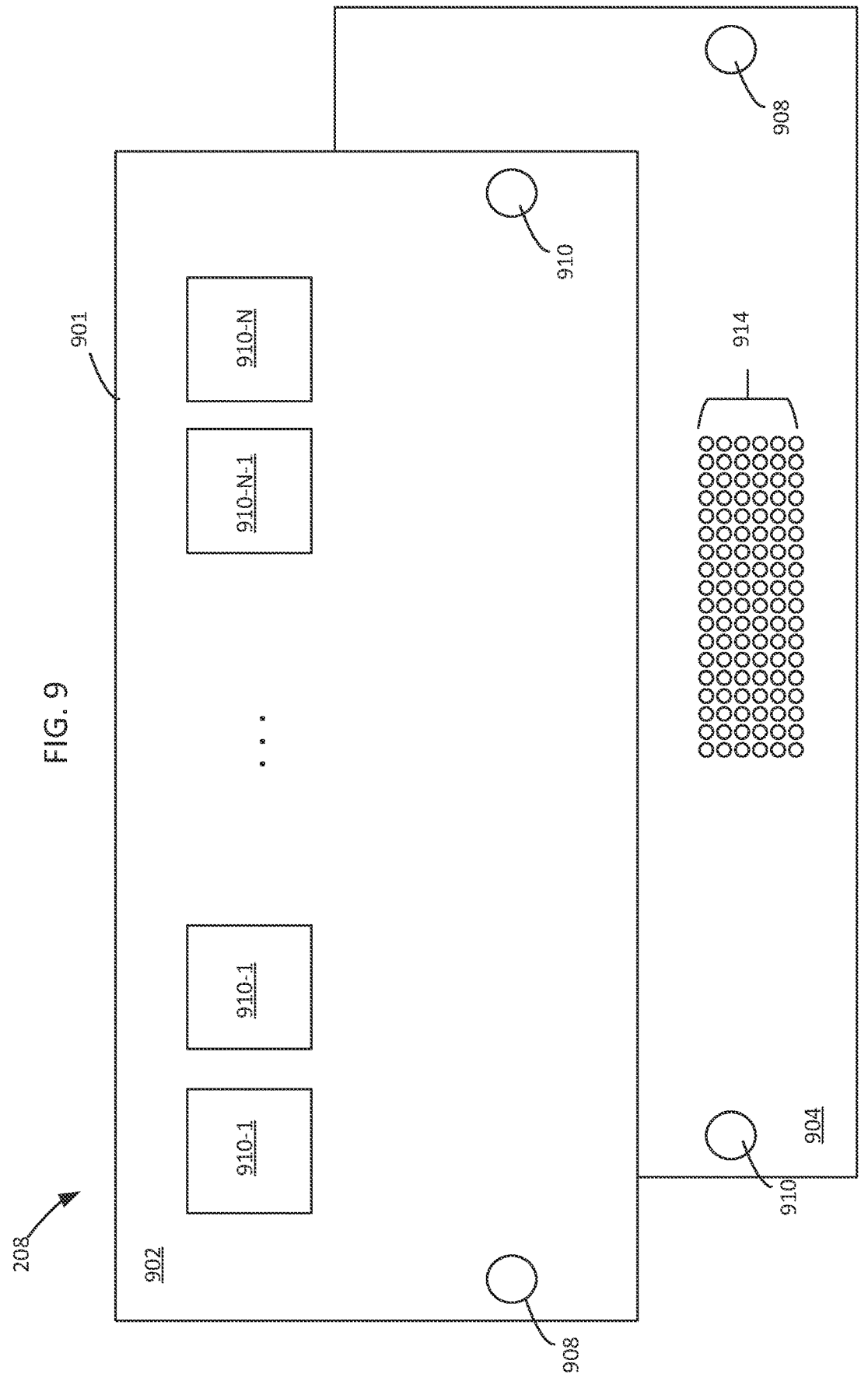
FIG. 9 illustrates front and back faces of an example of a memory module.

FIG. 9 illustrates front and back faces of an example of a memory module 208. In one example, the memory module 208 is a compression-attached memory module CAMM. The CAMM includes a PCB 901 and memory chips or dies 910-1-910-N on one or both faces 902, 904 of the PCB 901. The memory chips 910-1-910-N are coupled with conductive contacts 914 via conductive traces in or on the PCB 901. The conductive contacts 914 are to couple with corresponding conductive contacts on an adapter card (e.g., the conductive contacts 812 or 814 of the adapter card 210 of FIG. 8). In one example, compressible conductive contacts (such as the contacts 314 of FIG. 3) are between the contacts 914 of the memory module and the contacts 812 or 814 of the adapter card. In one such example, a CMT connector is between the contacts 914 of the memory module and the contacts 812 or 814 of the adapter card.

The memory module 208 includes holes 908 and 910 that correspond to holes 808 and 810 in the adapter card. The holes 908, 910 and 808, 810 are to receives fasteners, such as screws, to compressibly attach the memory module 208 to the adapter card 210. In one example, a single memory module 208 can be attached to one face 802 or 804 of the adapter card 210. In another example, two memory modules 208 can be attached to the opposing faces 802, 804 of the adapter card 210. In one such example, a fastener passes through holes in both memory modules 208 and the adapter card 210 to sandwich the adapter card 210 between the two memory modules 208. In an example in which a CMT connector is used to couple the contacts 914 of the memory module 208 with the corresponding contacts 812 or 814 of the adapter card, the CMT connector includes corresponding holes through which the fastener can pass.

Figure 10:
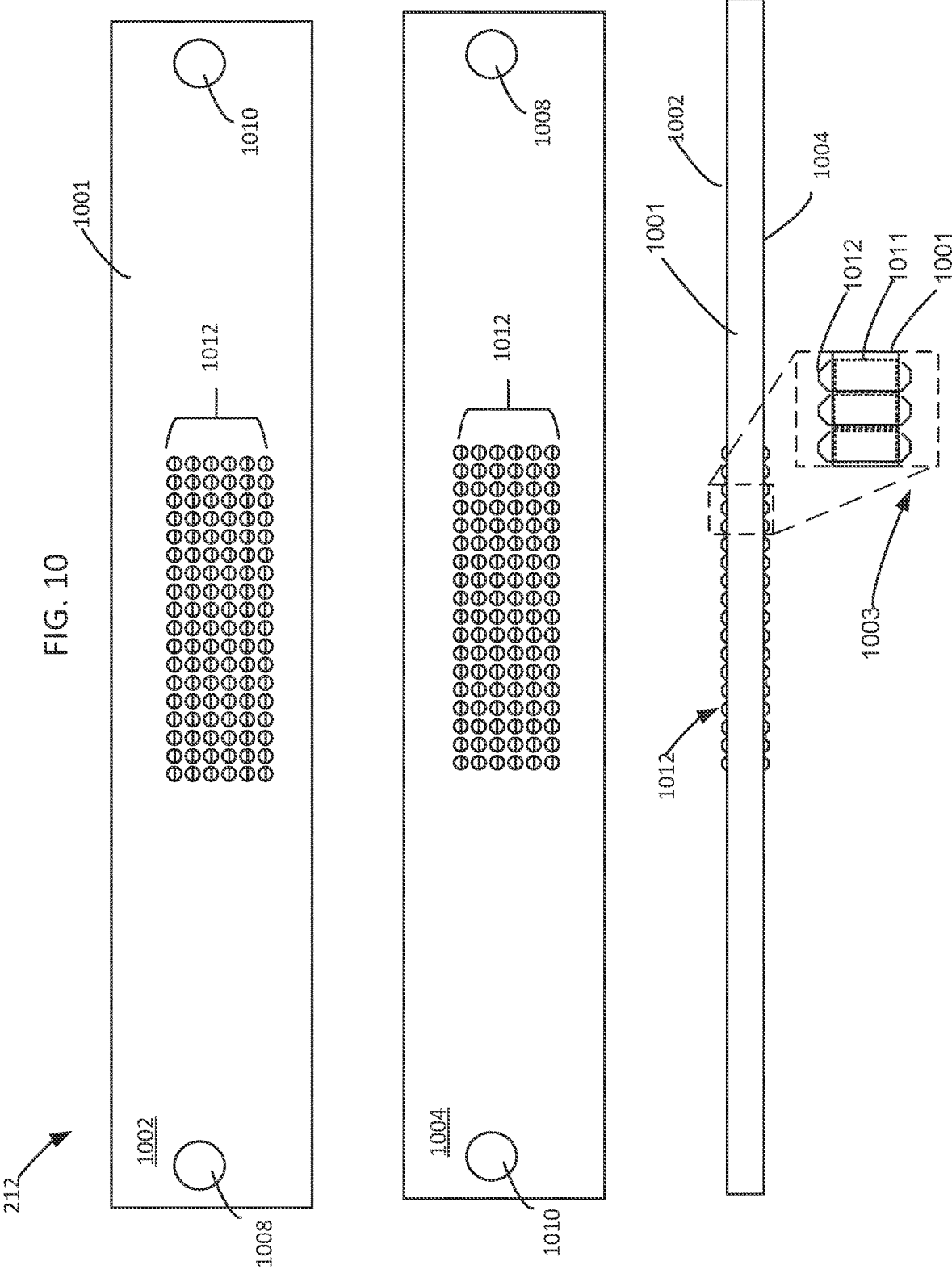
FIG. 10 illustrates front, back, and side views of an example of a CMT connector.

For example, FIG. 10 illustrates front, back, and side views of an example of a CMT connector 212. The CMT connector 212 includes a housing 1001 to provide support for the contacts 1012. The contacts 1012 extend through the CMT connector 212 and are exposed at both faces 1002 and 1004 of the CMT connector 212. In one example, the contacts 1012 are compressible pins, such as the C-shaped pins 314 illustrated in FIG. 3. In other example, the contacts 1012 are another compressible pin shape, such as a spring-shape, an S-shape, or pins having other shapes that can be compressed.

In one example, the pins are supported and kept in alignment by an array of holes or openings in the housing. In the example illustrated in FIG. 10, each of the pins 1012 is contained in a cylindrical hole or enclosure that extends through the housing 1001. For example, magnified view 1003 shows an example of a CMT connector 212 with openings 1011 in the housing 1001 that contain or include C-shaped pins 1012, such as the pins 314 illustrated in FIG. 3. However, other shapes of holes or enclosures may be used to support the conductive contacts 1012. In one example, the pressure applied by the fasteners through the holes 1008 and 1010 to the CMT connector 212, the adapter card 210, and the memory module(s) 208 cause the contacts 1012 to compress slightly into the holes in which they are enclosed.

Thus, an adapter card with compression-attached memory modules can be used to adapt CAMMs to conventional DIMM connectors on a motherboard that could not otherwise support CAMMs. When using two memory modules per channel (e.g., 2DPC), an adapter card can enable using a single connector for each channel, resulting in less spacing between adjacent memory modules, more connector-to-connector spacing, and less area occupied on the motherboard. For example, a three-channel memory subsystem can be achieved with only three DIMM connectors instead of six DIMM connectors that would be required in a conventional system. In addition to the PCB space savings. Although some examples above illustrate two compression-attached memory modules on an adapter card, other examples may include more than two compression-attached memory modules (e.g., 3, 4, or more than 4 CAMMs attached to an adapter card).

Figure 11A:
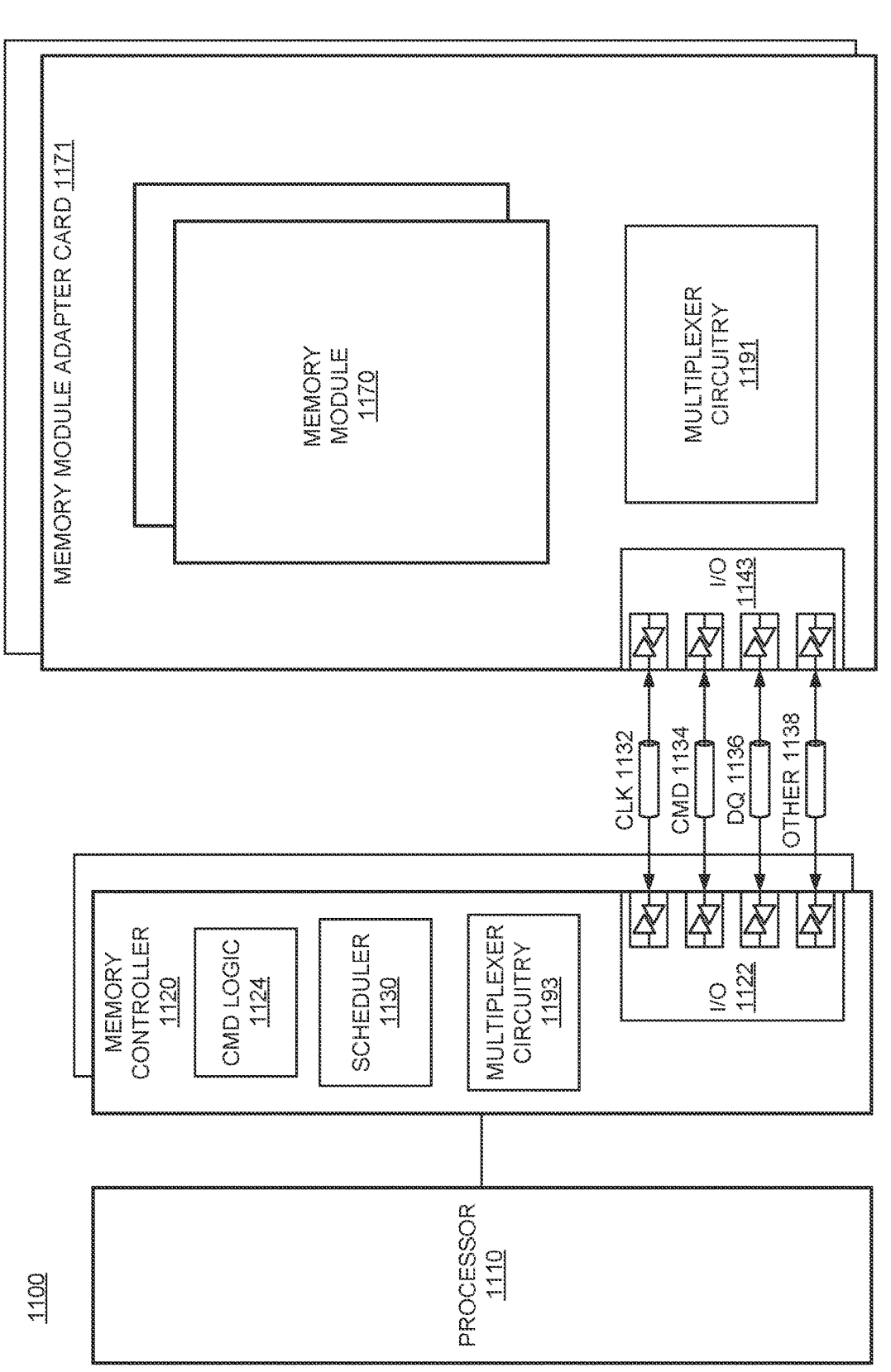
FIGS. 11A and 11B are block diagrams of an embodiment of a memory subsystem which can include an adapter card with compression-attached memory modules in accordance with examples described herein.
Figure 11B:
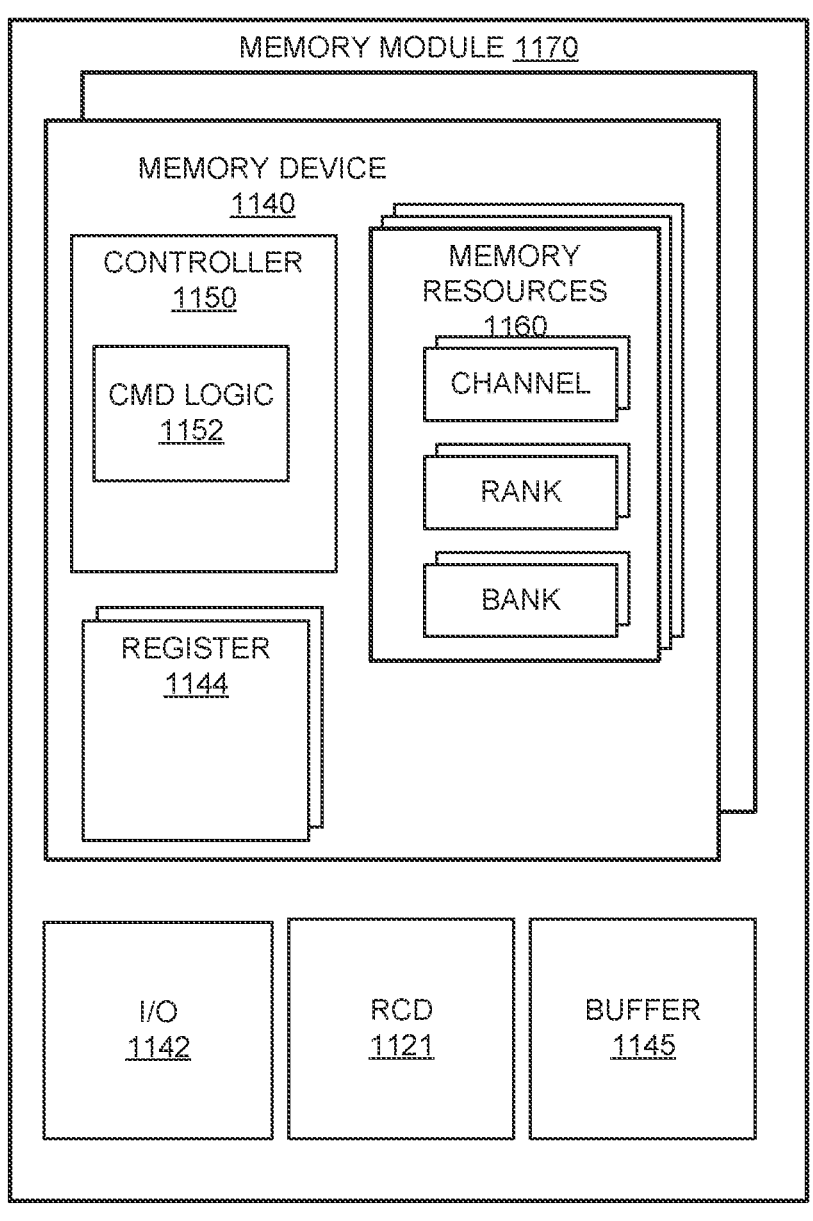

FIGS. 11A and 11B are block diagrams of an embodiment of a memory subsystem which can include an adapter card with compression-attached memory modules in accordance with examples described herein. System 1100 includes a processor and elements of a memory subsystem in a computing device. Processor 1110 represents a processing unit of a computing platform that may execute an operating system (OS) and applications, which can collectively be referred to as the host or the user of the memory. The OS and applications execute operations that result in memory accesses. Processor 1110 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. System 1100 can be implemented as an SOC (system on a chip) or be implemented with standalone components.

Reference to memory devices can apply to different memory types. Memory devices often refers to volatile memory technologies. Volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, originally published in September 2012 by JEDEC), DDR5 (DDR version 5, originally published in July 2020), LPDDR3 (Low Power DDR version 3, JESD209-3B, August 2013 by JEDEC), LPDDR4 (LPDDR version 4, JESD209-4, originally published by JEDEC in August 2014), LPDDR5 (LPDDR version 5, JESD209-5A, originally published by JEDEC in January 2020), WIO2 (Wide Input/Output version 2, JESD229-2 originally published by JEDEC in August 2014), HBM (High Bandwidth Memory, JESD235, originally published by JEDEC in October 2013), HBM2 (HBM version 2, JESD235C, originally published by JEDEC in January 2020), or HBM3 (HBM version 3 currently in discussion by JEDEC), or others or combinations of memory technologies, and technologies based on derivatives or extensions of such specifications. The JEDEC standards are available at www.jedec.org.

In addition to, or alternatively to, volatile memory, in one embodiment, reference to memory devices can refer to a nonvolatile memory device whose state is determinate even if power is interrupted to the device. In one embodiment, the nonvolatile memory device is a block addressable memory device, such as NAND or NOR technologies. Thus, a memory device can also include a future generation non-volatile devices, such as a three-dimensional crosspoint memory device, other byte addressable nonvolatile memory devices, or memory devices that use chalcogenide phase change material. In one embodiment, the memory device can be or include multi-threshold level NAND flash memory, NOR flash memory, single or multi-level phase change memory (PCM) or phase change memory with a switch (PCMS), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

Descriptions herein referring to a "RAM" or "RAM device" can apply to any memory device that allows random access, whether volatile or nonvolatile. Descriptions refer-ring to a "DRAM" or a "DRAM device" can refer to a volatile random access memory device. The memory device or DRAM can refer to the die itself, to a packaged memory product that includes one or more dies, or both. In one embodiment, a system with volatile memory that needs to be refreshed can also include nonvolatile memory.

Memory controller 1120 represents one or more memory controller circuits or devices for system 1100. Memory controller 1120 represents control logic that generates memory access commands in response to the execution of operations by processor 1110. Memory controller 1120 accesses one or more memory devices 1140. In one example, the memory controller 1120 includes multiplexer circuitry 1193 to enable multiplexing between data for multiple compression-attached modules 1170 plugged into a DIMM socket via an adapter card 1171. The multiplexer circuitry may be the same as, or similar to, the multiplexer circuitry 706 described with respect to FIG. 7. Memory devices 1140 can be DRAM devices in accordance with any referred to above. In one embodiment, memory devices 1140 are orga-nized and managed as different channels, where each chan-nel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combina-tion of these. Physical coupling can include direct contact. Electrical coupling includes an interface or interconnection that allows electrical flow between components, or allows signaling between components, or both. Communicative coupling includes connections, including wired or wireless, that enable components to exchange data.

In one embodiment, settings for each channel are con-trolled by separate mode registers or other register settings. In one embodiment, each memory controller 1120 manages a separate memory channel, although system 1100 can be configured to have multiple channels managed by a single controller, or to have multiple controllers on a single chan-nel. In one embodiment, memory controller 1120 is part of host processor 1110, such as logic implemented on the same die or implemented in the same package space as the processor.

Memory controller 1120 includes I/O interface logic 1122 to couple to a memory bus, such as a memory channel as referred to above. I/O interface logic 1122 (as well as I/O interface logic 1142 of memory device 1140) can include pins, pads, connectors, signal lines, traces, or wires, or other hardware to connect the devices, or a combination of these. I/O interface logic 1122 can include a hardware interface. As illustrated, I/O interface logic 1122 includes at least drivers/transceivers for signal lines. Commonly, wires within an integrated circuit interface couple with a pad, pin, or con-nector to interface signal lines or traces or other wires between devices. I/O interface logic 1122 can include driv-ers, receivers, transceivers, or termination, or other circuitry or combinations of circuitry to exchange signals on the signal lines between the devices. The exchange of signals includes at least one of transmit or receive. While shown as coupling I/O 1122 from memory controller 1120 to I/O 1142 of memory device 1140, it will be understood that in an implementation of system 1100 where groups of memory devices 1140 are accessed in parallel, multiple memory devices can include I/O interfaces to the same interface of memory controller 1120. In an implementation of system 1100 including one or more memory modules 1170, I/O 1142 can include interface hardware of the memory module in addition to interface hardware on the memory device itself. Other memory controllers 1120 will include separate interfaces to other memory devices 1140.

The bus between memory controller 1120 and memory devices 1140 can be implemented as multiple signal lines coupling memory controller 1120 to memory devices 1140. The bus may typically include at least clock (CLK) 1132, command/address (CMD) 1134, and write data (DQ) and read data (DQ) 1136, and zero or more other signal lines 1138. In one embodiment, a bus or connection between memory controller 1120 and memory can be referred to as a memory bus. The signal lines for CMD can be referred to as a "C/A bus" (or ADD/CMD bus, or some other designa-tion indicating the transfer of commands (C or CMD) and address (A or ADD) information) and the signal lines for write and read DQ can be referred to as a "data bus." In one embodiment, independent channels have different clock signals, C/A buses, data buses, and other signal lines. Thus, system 1100 can be considered to have multiple "buses," in the sense that an independent interface path can be consid-ered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 1120 and memory devices 1140. An example of a serial bus technology is 8B10B encoding and transmission of high-speed data with embedded clock over a single differential pair of signals in each direction. In one embodiment, CMD 1134 represents signal lines shared in parallel with multiple memory devices. In one embodi-ment, multiple memory devices share encoding command signal lines of CMD 1134, and each has a separate chip select (CS_n) signal line to select individual memory devices.

It will be understood that in the example of system 1100, the bus between memory controller 1120 and memory devices 1140 includes a subsidiary command bus CMD 1134 and a subsidiary bus to carry the write and read data, DQ 1136. In one embodiment, the data bus can include bidirectional lines for read data and for write/command data. In another embodiment, the subsidiary bus DQ 1136 can include unidirectional write signal lines for write and data from the host to memory and can include unidirectional lines for read data from the memory to the host. In accordance with the chosen memory technology and system design, other signals 1138 may accompany a bus or sub bus, such as strobe lines DQS. Based on design of system 1100, or implementation if a design supports multiple implementations, the data bus can have more or less bandwidth per memory device 1140. For example, the data bus can support memory devices that have either a ×32 interface, a ×16 interface, a ×8 interface, or other interface. The convention "×W," where W is an integer that refers to an interface size or width of the interface of memory device 1140, which represents a number of signal lines to exchange data with memory controller 1120. The interface size of the memory devices is a controlling factor on how many memory devices can be used concurrently per channel in system 1100 or coupled in parallel to the same signal lines. In one embodiment, high bandwidth memory devices, wide interface devices, or stacked memory configurations, or combinations, can enable wider interfaces, such as a ×128 interface, a ×256 interface, a ×512 interface, a ×1024 interface, or other data bus interface width.

In one embodiment, memory devices 1140 and memory controller 1120 exchange data over the data bus in a burst, or a sequence of consecutive data transfers. The burst corresponds to a number of transfer cycles, which is related to a bus frequency. In one embodiment, the transfer cycle can be a whole clock cycle for transfers occurring on a same clock or strobe signal edge (e.g., on the rising edge). In one embodiment, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length 8 (BL8), and each memory device 1140 can transfer data on each UI. Thus, a ×8 memory device operating on BL8 can transfer 64 bits of data (8 data signal lines times 8 data bits transferred per line over the burst). It will be understood that this simple example is merely an illustration and is not limiting.

Memory devices 1140 represent memory resources for system 1100. In one embodiment, each memory device 1140 is a separate memory die. In one embodiment, each memory device 1140 can interface with multiple (e.g., 2) channels per device or die. Each memory device 1140 includes I/O interface logic 1142, which has a bandwidth determined by the implementation of the device (e.g., ×16 or ×8 or some other interface bandwidth). I/O interface logic 1142 enables the memory devices to interface with memory controller 1120. I/O interface logic 1142 can include a hardware interface and can be in accordance with I/O 1122 of memory controller, but at the memory device end. In one embodiment, multiple memory devices 1140 are connected in parallel to the same command and data buses. In another embodiment, multiple memory devices 1140 are connected in parallel to the same command bus and are connected to different data buses. For example, system 1100 can be configured with multiple memory devices 1140 coupled in parallel, with each memory device responding to a command, and accessing memory resources 1160 internal to each. For a Write operation, an individual memory device

1140 can write a portion of the overall data word, and for a Read operation, an individual memory device 1140 can fetch a portion of the overall data word. As non-limiting examples, a specific memory device can provide or receive, respectively, 8 bits of a 128-bit data word for a Read or Write transaction, or 8 bits or 16 bits (depending for a ×8 or a ×16 device) of a 256-bit data word. The remaining bits of the word will be provided or received by other memory devices in parallel.

In one embodiment, memory devices 1140 are disposed directly on a motherboard or host system platform (e.g., a PCB (printed circuit board) on which processor 1110 is disposed) of a computing device. In one embodiment, memory devices 1140 can be organized into memory modules 1170. The memory modules 1170 may represent dual inline memory modules (DIMMs), compression-attached memory modules (CAMMs), or other memory modules. In one embodiment, memory modules 1170 represent other organization of multiple memory devices to share at least a portion of access or control circuitry, which can be a separate circuit, a separate device, or a separate board from the host system platform. Memory modules 1170 can include multiple memory devices 1140, and the memory modules can include support for multiple separate channels to the included memory devices disposed on them. In another embodiment, memory devices 1140 may be incorporated into the same package as memory controller 1120, such as by techniques such as multi-chip-module (MCM), package-on-package, through-silicon via (TSV), or other techniques or combinations. Similarly, in one embodiment, multiple memory devices 1140 may be incorporated into memory modules 1170, which themselves may be incorporated into the same package as memory controller 1120. It will be appreciated that for these and other embodiments, memory controller 1120 may be part of host processor 1110. As depicted in FIG. 11A, multiple memory modules 1170 may be coupled with the memory controller via an adapter card 1171. In one such example, the adapter card 1171 includes multiplexer circuitry 1191 to multiplex data amongst the CAMMs 1170 attached to the adapter card 1171. In one example, the multiplexer circuitry 1191 is the same as, or similar to, the multiplexer circuitry 511 of FIG. 5A or 521 of FIG. 5B. The adapter card 1171 also includes I/O interface logic 1143 to enable the memory modules 1170 on the adapter card 1171 to interface with memory controller 1120. I/O interface logic 1143 can include a hardware interface and can be in accordance with I/O 1122 of memory controller, but at the memory device end.

Memory devices 1140 each include memory resources 1160. Memory resources 1160 represent individual arrays of memory locations or storage locations for data. Typically, memory resources 1160 are managed as rows of data, accessed via wordline (rows) and bitline (individual bits within a row) control. Memory resources 1160 can be organized as separate channels, ranks, and banks of memory. Channels may refer to independent control paths to storage locations within memory devices 1140. A rank refers to memory devices coupled with the same chip select. Ranks may refer to common locations across multiple memory devices (e.g., same row addresses within different devices). Banks may refer to arrays of memory locations within a memory device 1140. In one embodiment, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one embodiment, memory devices 1140 include one or more registers 1144. Register 1144 represents one or more storage devices or storage locations that provide configuration or settings for the operation of the memory device. In one embodiment, register 1144 can provide a storage location for memory device 1140 to store data for access by memory controller 1120 as part of a control or management operation. In one embodiment, register 1144 includes one or more Mode Registers. In one embodiment, register 1144 includes one or more multipurpose registers. The configuration of locations within register 1144 can configure memory device 1140 to operate in different "modes," where command information can trigger different operations within memory device 1140 based on the mode. Additionally, or in the alternative, different modes can also trigger different operation from address information or other signal lines depending on the mode. Settings of register 1144 can indicate configuration for I/O settings (e.g., timing, termination or ODT (on-die termination), driver configuration, or other I/O settings).

Memory device 1140 includes controller 1150, which represents control logic within the memory device to control internal operations within the memory device. For example, controller 1150 decodes commands sent by memory controller 1120 and generates internal operations to execute or satisfy the commands. Controller 1150 can be referred to as an internal controller and is separate from memory controller 1120 of the host. Controller 1150 can determine what mode is selected based on register 1144 and configure the internal execution of operations for access to memory resources 1160 or other operations based on the selected mode. Controller 1150 generates control signals to control the routing of bits within memory device 1140 to provide a proper interface for the selected mode and direct a command to the proper memory locations or addresses. Controller 1150 includes command logic 1152, which can decode command encoding received on command and address signal lines. Thus, command logic 1152 can be or include a command decoder. With command logic 1152, memory device can identify commands and generate internal operations to execute requested commands.

Referring again to memory controller 1120, memory controller 1120 includes command (CMD) logic 1124, which represents logic or circuitry to generate commands to send to memory devices 1140. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 1140, memory controller 1120 can issue commands via I/O 1122 to cause memory device 1140 to execute the commands. In one embodiment, controller 1150 of memory device 1140 receives and decodes command and address information received via I/O 1142 from memory controller 1120. Based on the received command and address information, controller 1150 can control the timing of operations of the logic and circuitry within memory device 1140 to execute the commands. Controller 1150 is responsible for compliance with standards or specifications within memory device 1140, such as timing and signaling requirements. Memory controller 1120 can implement compliance with standards or specifications by access scheduling and control.

Memory controller 1120 includes scheduler 1130, which represents logic or circuitry to generate and order transactions to send to memory device 1140. From one perspective, the primary function of memory controller 1120 could be said to schedule memory access and other transactions to memory device 1140. Such scheduling can include generating the transactions themselves to implement the requests for data by processor 1110 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 1120 typically includes logic such as scheduler 1130 to allow selection and ordering of transactions to improve performance of system 1100. Thus, memory controller 1120 can select which of the outstanding transactions should be sent to memory device 1140 in which order, which is typically achieved with logic much more complex that a simple first-in first-out algorithm. Memory controller 1120 manages the transmission of the transactions to memory device 1140, and manages the timing associated with the transaction. In one embodiment, transactions have deterministic timing, which can be managed by memory controller 1120 and used in determining how to schedule the transactions with scheduler 1130.

Referring again to the memory module 1170, in one example, buffer devices 1121 and 1145 are included on the module 1170 to buffer signals between the memory controller and the memory devices and control the timing and signaling to the DRAMs. The buffer device 1145 receives and buffers data signals. The buffer device 1121 is typically referred to as a register or a registered or registering clock driver (RCD). The RCD 1121 receives command and clock signals from the memory controller 1120 and forwards them to the memory devices in accordance with relevant protocols and standard specifications. For example, the RCD 1121 may be in compliance with the DDR4 Registering Clock Driver Specification (DDR4RCD02 JESD82-31A), the DDR5 Registering Clock Driver Specification (DDR5RCD02 currently in discussion by JEDEC), or other RCD standards. Other memory modules are unbuffered and do not include an RCD.

Figure 12:
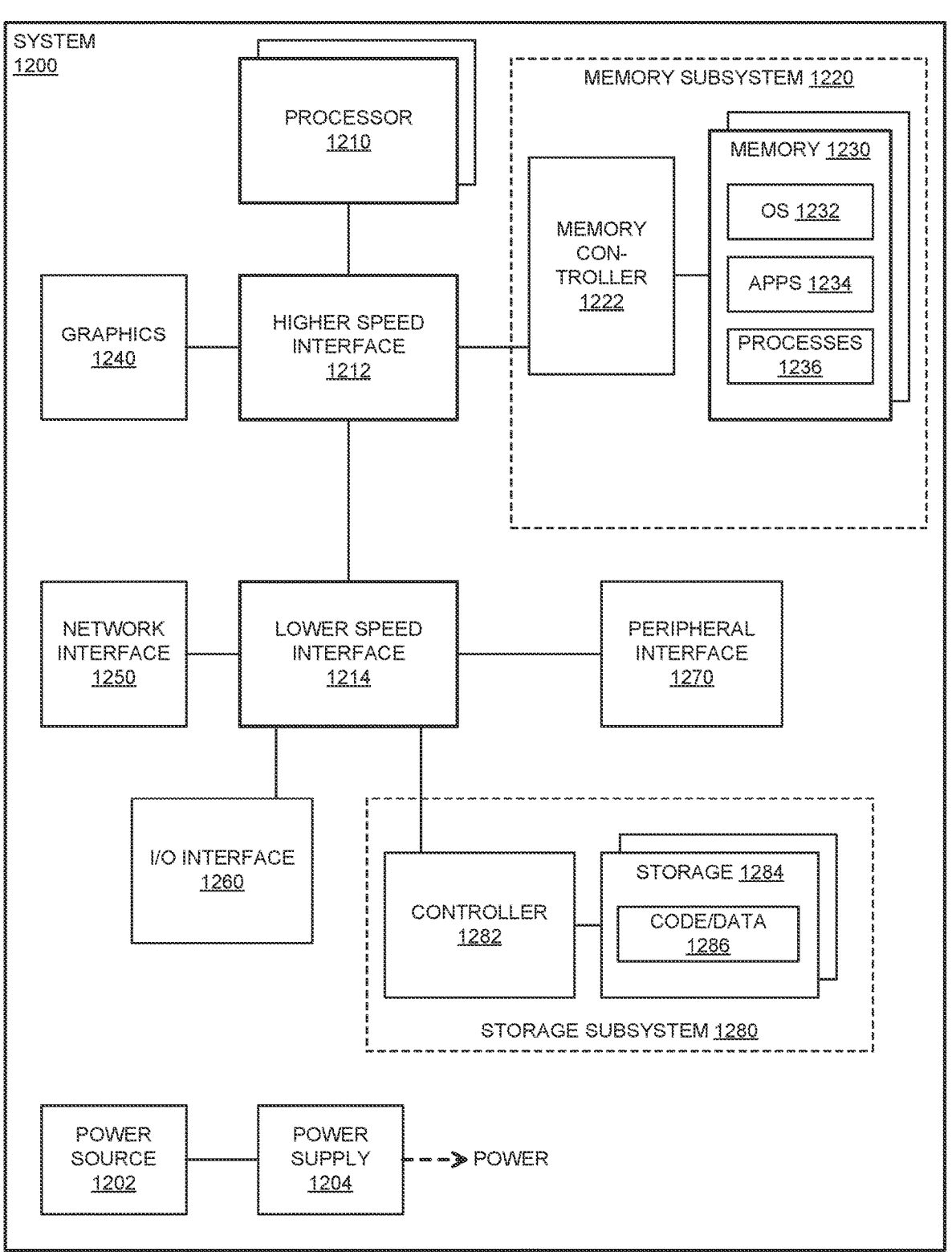
FIG. 12 is a block diagram of an embodiment of a computing system that can include an adapter card with compression-attached memory modules in accordance with examples described herein.

FIG. 12 is a block diagram of an embodiment of a computing system that can include an adapter card with compression-attached memory modules. System 1200 represents a computing device in accordance with any embodiment described herein, and can be a laptop computer, a desktop computer, a tablet computer, a server, a gaming or entertainment control system, a scanner, copier, printer, routing or switching device, embedded computing device, a smartphone, a wearable device, an internet-of-things device, or other electronic device.

System 1200 includes processor 1210, which provides processing, operation management, and execution of instructions for system 1200. Processor 1210 can include any type of microprocessor, central processing unit (CPU), graphics processing unit (GPU), processing core, or other processing hardware to provide processing for system 1200, or a combination of processors. Processor 1210 controls the overall operation of system 1200, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one embodiment, system 1200 includes interface 1212 coupled to processor 1210, which can represent a higher speed interface or a high throughput interface for system components that needs higher bandwidth connections, such as memory subsystem 1220 or graphics interface components 1240. Interface 1212 represents an interface circuit, which can be a standalone component or integrated onto a processor die. Where present, graphics interface 1240 interfaces to graphics components for providing a visual display to a user of system 1200. In one embodiment, graphics interface 1240 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one embodiment, the display can include a touchscreen display. In one embodiment, graphics interface 1240 generates a display based on data stored in memory 1230 or based on operations executed by processor 1210 or both. In one embodiment, graphics interface 1240 generates a display based on data stored in memory 1230 or based on operations executed by processor 1210 or both.

Memory subsystem 1220 represents the main memory of system 1200 and provides storage for code to be executed by processor 1210, or data values to be used in executing a routine. Memory subsystem 1220 can include one or more memory devices 1230 such as read-only memory (ROM), flash memory, one or more varieties of random-access memory (RAM) such as DRAM, or other memory devices, or a combination of such devices. Memory 1230 stores and hosts, among other things, operating system (OS) 1232 to provide a software platform for execution of instructions in system 1200. Additionally, applications 1234 can execute on the software platform of OS 1232 from memory 1230. Applications 1234 represent programs that have their own operational logic to perform execution of one or more functions. Processes 1236 represent agents or routines that provide auxiliary functions to OS 1232 or one or more applications 1234 or a combination. OS 1232, applications 1234, and processes 1236 provide software logic to provide functions for system 1200. In one embodiment, memory subsystem 1220 includes memory controller 1222, which is a memory controller to generate and issue commands to memory 1230. It will be understood that memory controller 1222 could be a physical part of processor 1210 or a physical part of interface 1212. For example, memory controller 1222 can be an integrated memory controller, integrated onto a circuit with processor 1210.

While not specifically illustrated, it will be understood that system 1200 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one embodiment, system 1200 includes interface 1214, which can be coupled to interface 1212. Interface 1214 can be a lower speed interface than interface 1212. In one embodiment, interface 1214 represents an interface circuit, which can include standalone components and integrated circuitry. In one embodiment, multiple user interface components or peripheral components, or both, couple to interface 1214. Network interface 1250 provides system 1200 the ability to communicate with remote devices (e.g., servers or other computing devices) over one or more networks. Network interface 1250 can include an Ethernet adapter, wireless interconnection components, cellular network interconnection components, USB (universal serial bus), or other wired or wireless standards-based or proprietary interfaces. Network interface 1250 can exchange data with a remote device, which can include sending data stored in memory or receiving data to be stored in memory.

In one embodiment, system 1200 includes one or more input/output (I/O) interface(s) 1260. I/O interface 1260 can include one or more interface components through which a user interacts with system 1200 (e.g., audio, alphanumeric, tactile/touch, or other interfacing). Peripheral interface 1270 can include any hardware interface not specifically mentioned above. Peripherals refer generally to devices that connect dependently to system 1200. A dependent connection is one where system 1200 provides the software platform or hardware platform or both on which operation executes, and with which a user interacts.

In one embodiment, system 1200 includes storage subsystem 1280 to store data in a nonvolatile manner. In one embodiment, in certain system implementations, at least certain components of storage 1280 can overlap with components of memory subsystem 1220. Storage subsystem 1280 includes storage device(s) 1284, which can be or include any conventional medium for storing large amounts of data in a nonvolatile manner, such as one or more magnetic, solid state, or optical based disks, or a combination. Storage 1284 holds code or instructions and data 1286 in a persistent state (i.e., the value is retained despite interruption of power to system 1200). Storage 1284 can be generically considered to be a "memory," although memory 1230 is typically the executing or operating memory to provide instructions to processor 1210. Whereas storage 1284 is nonvolatile, memory 1230 can include volatile memory (i.e., the value or state of the data is indeterminate if power is interrupted to system 1200). In one embodiment, storage subsystem 1280 includes controller 1282 to interface with storage 1284. In one embodiment controller 1282 is a physical part of interface 1214 or processor 1210 or can include circuits or logic in both processor 1210 and interface 1214.

Power source 1202 provides power to the components of system 1200. More specifically, power source 1202 typically interfaces to one or multiple power supplies 1204 in system 1200 to provide power to the components of system 1200. In one embodiment, power supply 1204 includes an AC to DC (alternating current to direct current) adapter to plug into a wall outlet. Such AC power can be renewable energy (e.g., solar power) power source 1202. In one embodiment, power source 1202 includes a DC power source, such as an external AC to DC converter. In one embodiment, power source 1202 or power supply 1204 includes wireless charging hardware to charge via proximity to a charging field. In one embodiment, power source 1202 can include an internal battery or fuel cell source.

Thus, multiplexer circuitry can be added to the center module in the vertical DIMM connector on a motherboard. In one example, the multiplexer circuitry divides the DRAM signaling rates on each pseudo channel by a factor of two. Regarding slots per channel, in one example, one slot per channel (1SPC) on the motherboard can be expanded to two slots per channel (2SPC). In one example, the number of vertical connectors on a motherboard can be cut in half, enabling significant PCB area saving for the memory region.

Examples of a memory module adapter with multiplexer circuitry follow:

Example 1: An apparatus including: a printed circuit board having an edge to be received by a dual inline memory module (DIMM) connector, a first memory module compressibly attached to the PCB, a second memory module compressibly attached to the PCB, and circuitry to multiplex data between the first memory module and the second memory module during a same burst access sequence.

Example 2: The apparatus of example 1, wherein: the circuitry is to: receive write data from a host at a first frequency and send demultiplexed write data to the first memory module and the second memory module at a second frequency that is slower than the first frequency.

Example 3: The apparatus of example 2, wherein the circuitry is to: send the demultiplexed write data to the first memory module with a phase shift relative to the demultiplexed write data sent to the second memory module.

Example 4: The apparatus of example 2, wherein: the circuitry is to: send the demultiplexed write data to the first memory module and the second memory module at the same time.

Example 5: The apparatus of any of examples 1-4, wherein: the circuitry is to: multiplex the data between the first memory module and the second memory module during a same burst write sequence or a same burst read sequence.

Example 6: The apparatus of any of examples 1-5, wherein: the circuitry includes a multiplexer.

Example 7: The apparatus of any of examples 1-6, wherein: the circuitry includes buffer circuitry to store-and-forward at least some of the data.

Example 8: The apparatus of any of examples 1-7, further including: a third memory module compressibly attached to the PCB, wherein the circuitry is to: multiplex data amongst the first memory module, the second memory module, and the third memory module during a same burst access sequence.

Example 9: The apparatus of example 8, further including: a fourth memory module compressibly attached to the PCB, wherein the circuitry is to: multiplex data amongst the first memory module, the second memory module, the third memory module, and the fourth memory module during a same burst access sequence.

Example 10: The apparatus of any of examples 1-9, wherein: the first memory module and the second memory modules are compression-attached memory modules (CAMMs) or CMT memory modules.

Example 11: The apparatus of any of examples 1-10, further including: a first compression mount technology (CMT) connector between the PCB and the first memory module, and a second compression mount technology (CMT) connector between the PCB and the second memory module.

Example 12: A system including: a processor, and a memory controller coupled with the processor, the memory controller including input/output (I/O) interface circuitry to interface with a first compression-attached memory module (CAMM) and a second CAMM on an adapter card in a dual-inline memory module (DIMM) slot, and circuitry to multiplex data for the first CAMM and data for the second CAMM over a same burst access sequence.

Example 13: The system of example 12, further including: the adapter card with the first CAMM and the second CAMM.

Example 14: The system of example 12 or 13, wherein the first CAMM and/or the second CAMM are in accordance with any of examples 1-11.

Example 15: An apparatus including a printed circuit board (PCB) having an edge to be received by a dual-inline memory module (DIMM) connector, first conductive contacts proximate to the edge of the PCB to be received by the DIMM connector, the first conductive contacts to couple with contacts of the DIMM connector, second conductive contacts on a first face of the PCB to couple with a first compression attached memory module (CAMM), third conductive contacts on a second face of the PCB to couple with a second CAMM, and circuitry to multiplex data between the CAMM and the second CAMM during a same burst access sequence.

Example 16: The apparatus of example 15, wherein: the circuitry is to: receive write data from a host at a first frequency and send demultiplexed write data to the first CAMM and the second CAMM at a second frequency that is slower than the first frequency.

Example 17: The apparatus of example 16, wherein: the circuitry is to: send the demultiplexed write data to the first CAMM with a phase shift relative to the demultiplexed write data sent to the second CAMM.

Example 18: The apparatus of example 16, wherein: the circuitry is to: send the demultiplexed write data to the first CAMM and the second CAMM at the same time.

Example 19: The apparatus of example 15, wherein: the circuitry is to: multiplex the data between the first CAMM and the second CAMM during a same burst write sequence or a same burst read sequence.

Example 20: The apparatus of any of examples 15-19, further including: a first compression mount technology (CMT) connector between the PCB and the first CAMM, and a second compression mount technology (CMT) connector between the PCB and the second CAMM.

Example 20: The apparatus of any of examples 15-20, further including the first CAMM, and the second CAMM.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch"

code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

The hardware design embodiments discussed above may be embodied within a semiconductor chip and/or as a description of a circuit design for eventual targeting toward a semiconductor manufacturing process. In the case of the later, such circuit descriptions may take of the form of a (e.g., VHDL or Verilog) register transfer level (RTL) circuit description, a gate level circuit description, a transistor level circuit description or mask description or various combinations thereof. Circuit descriptions are typically embodied on a computer readable storage medium (such as a CD-ROM or other type of storage technology).

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A system comprising:
a printed circuitry board (PCB);
a processor mounted on the PCB, the processor coupled with a memory controller;
a dual-inline memory module (DIMM) connector mounted to the PCB, the DIMM connector to include contacts arranged to electrically couple with input/output (I/O) interface circuitry of the memory controller; and
an adaptor card, the adaptor card to include:
first conductive contacts proximate to an edge of the adaptor card, the edge of the adaptor card arranged to be received by the DIMM connector, the first conductive contacts configured to couple with contacts included in the DIMM connector;
second conductive contacts on a first face of the adaptor card configured to couple with a first compression attached memory module (CAMM) and to enable a communicative coupling between the I/O interface circuitry of the memory controller and the first CAMM through the first and second conductive contacts;
third conductive contacts on a second face of the adaptor card configured to couple with a second CAMM and to enable a communicative coupling between the I/O interface circuitry of the memory controller and the second CAMM through the first and third conductive contacts; and
multiplexor circuitry configured to time multiplex data access between the first CAMM and the second CAMM to enable the first CAMM to be accessed in parallel with the second CAMM being made ready for access during a first timing cycle then enable the second CAMM to be accessed in parallel with the first CAMM being ready for access during a second, subsequent timing cycle.

2. The system of claim 1, further comprising:
the first CAMM; and
the second CAMM.

3. An adaptor card comprising:
first conductive contacts proximate to an edge of the adaptor card, the edge of the adaptor card arranged to be received by a dual-inline memory module (DIMM) connector mounted to a printed circuitry board (PCB), the first conductive contacts configured to couple with contacts of the DIMM connector when the edge of the adaptor card is received in the DIMM connector;
second conductive contacts on a first face of the adaptor card configured to couple with a first compression attached memory module (CAMM);
third conductive contacts on a second face of the adaptor card configured to couple with a second CAMM; and
multiplexor circuitry configured to time multiplex data access between the first CAMM and the second CAMM to enable the first CAMM to be accessed in parallel with the second CAMM being made ready for access during a first timing cycle then enable the second CAMM to be accessed in parallel with the first CAMM being ready for access during a second, subsequent timing cycle.

4. The adaptor card of claim 3, wherein the multiplexor circuitry is further configured to:
receive write data from a host at a first frequency; and
send demultiplexed write data to the first CAMM and the second CAMM at a second frequency that is slower than the first frequency.

5. The adaptor card of claim 4, wherein the multiplexor circuitry is further configured to:
send the demultiplexed write data to the first CAMM with a phase shift relative to the demultiplexed write data sent to the second CAMM.

6. The adaptor card of claim 4, wherein the multiplexor circuitry is further configured to:
send the demultiplexed write data to the first CAMM and the second CAMM at a same time.

7. The adaptor card of claim 3, wherein the multiplexor circuitry is further configured to:
time multiplex the data access between the first CAMM and the second CAMM during a same burst write sequence or a same burst read sequence.

8. The adaptor card of claim 3, further comprising:

a first compression mount technology (CMT) connector mounted on the first face of the adaptor card, the first CMT connector configured to house the second conductive contacts; and a second CMT connector mounted on the second face of the adaptor card, the second CMT connector configured to house the third conductive contacts.

9. The adaptor card of claim 3, further comprising:

the first CAMM; and the second CAMM.

10. The system of claim 1, wherein the adaptor card multiplexor circuitry is further configured to:

receive write data from the memory controller at a first frequency; and send demultiplexed write data to the first CAMM and the second CAMM at a second frequency that is slower than the first frequency.

11. The system of claim 10, wherein the adaptor card multiplexor circuitry is further configured to:

send the demultiplexed write data to the first CAMM with a phase shift relative to the demultiplexed write data sent to the second CAMM.

12. The system of claim 10, wherein the adaptor card multiplexor circuitry is further configured to:

send the demultiplexed write data to the first CAMM and the second CAMM at a same time.

13. The system of claim 1, wherein the adaptor card multiplexor circuitry is further configured to:

time multiplex the data access between the first CAMM and the second CAMM during a same burst write sequence or a same burst read sequence.

14. The system of claim 1, wherein the adaptor card further includes:

a first compression mount technology (CMT) connector mounted on the first face of the adaptor card, the first CMT connector configured to house the second conductive contacts; and a second CMT connector mounted on the second face of the adaptor card, the second CMT connector configured to house the third conductive contacts.

* * * * *